United States Patent
Abdi

(10) Patent No.: US 9,337,917 B2
(45) Date of Patent: May 10, 2016

(54) CALL ESTABLISHMENT OPTIMIZATION FOR IMS BASED MOBILE SATELLITE SYSTEM

(71) Applicant: TELEFONAKTIEBOLAGET L M ERICSSON (PUBL), Stockholm (SE)

(72) Inventor: Sam Abdi, Fairview, TX (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 463 days.

(21) Appl. No.: 13/887,578

(22) Filed: May 6, 2013

(65) Prior Publication Data

US 2013/0301521 A1 Nov. 14, 2013

Related U.S. Application Data

(60) Provisional application No. 61/644,190, filed on May 8, 2012.

(51) Int. Cl.
*H04B 7/185* (2006.01)
*H04L 29/06* (2006.01)

(52) U.S. Cl.
CPC .......... *H04B 7/18513* (2013.01); *H04L 65/105* (2013.01); *H04L 65/1006* (2013.01); *H04L 65/1016* (2013.01); *H04L 65/1069* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 8,457,114 B2* | 6/2013 | Sahin | .................. | H04L 65/1016 370/351 |
| 2010/0158138 A1* | 6/2010 | Ryu | .................. | H04B 7/18513 375/259 |
| 2010/0279670 A1* | 11/2010 | Ghai | .................. | H04L 65/1083 455/414.3 |
| 2011/0075655 A1* | 3/2011 | Sahin | .................. | H04L 65/1016 370/352 |
| 2013/0217422 A1* | 8/2013 | Zakaria | .............. | H04B 7/18539 455/458 |
| 2013/0223333 A1* | 8/2013 | Sahin | .................. | H04L 65/1016 370/315 |
| 2014/0045492 A1* | 2/2014 | Zakaria | .............. | H04B 7/18539 455/427 |

OTHER PUBLICATIONS

3$^{rd}$ Generation Partnership Project; Technical Specification Group Services and Architecture; Optimisations and Enhancements for Realtime IMS communication (Release 7) 3GPP TR 23.818 v0.10.0. (Feb. 2007).
3$^{rd}$ Generation Partnership Project; Technical Specification Group Core Network and Terminals; Rx Interface and Rx/Gx signaling flows (Release 6). 3GPP TS 29.211 v6.4.0 (Jun. 2007).

* cited by examiner

*Primary Examiner* — Ayaz Sheikh
*Assistant Examiner* — Faiyazkhan Ghafoerkhan

(57) ABSTRACT

IMS nodes and a satellite radio access node (RAN) are described herein which are operative to establish certain calls (e.g., voice calls) with reduced latency and selectively using a High Penetration Alert (HPA) page to reach a terminating satellite user equipment (UE).

16 Claims, 41 Drawing Sheets

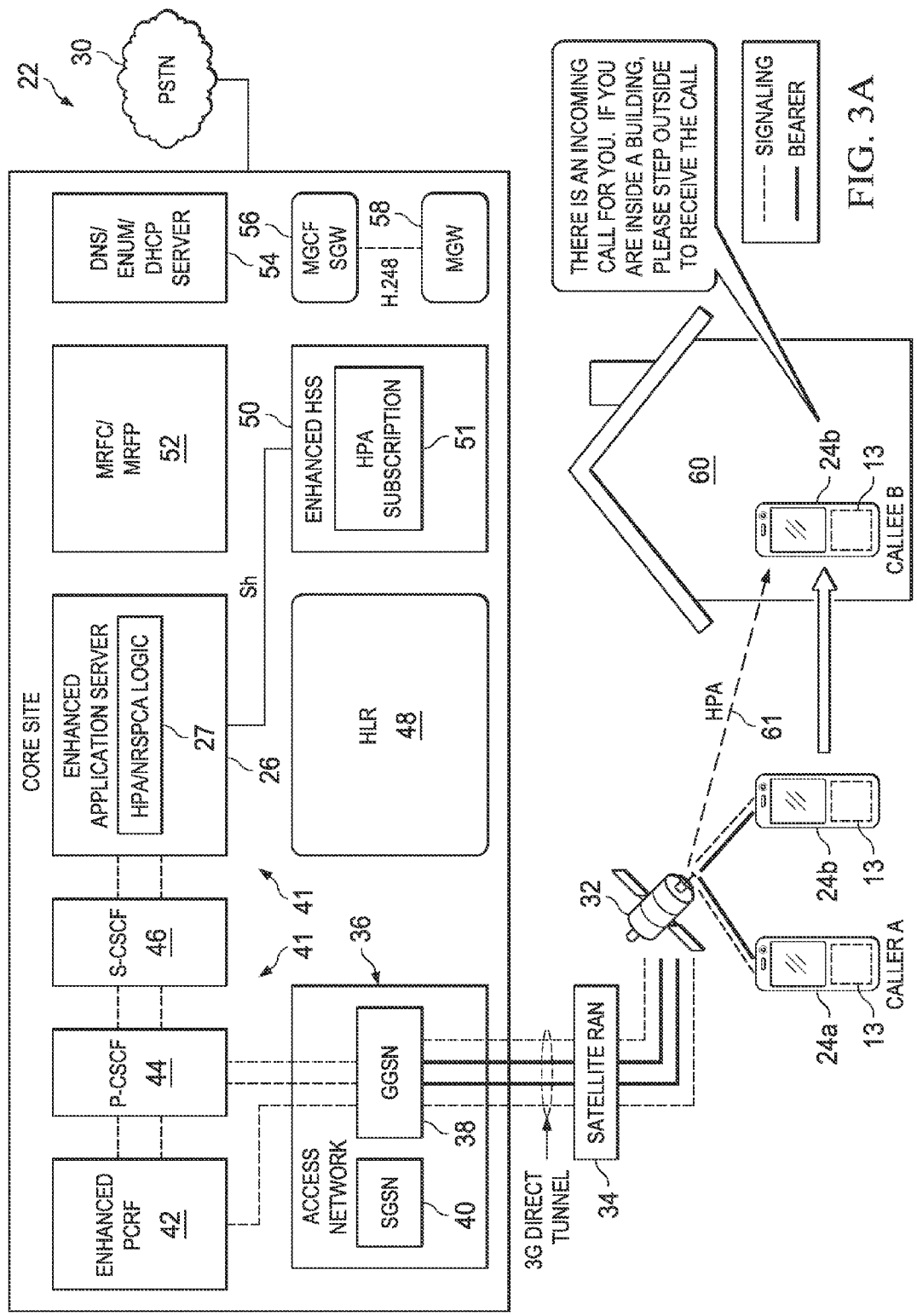

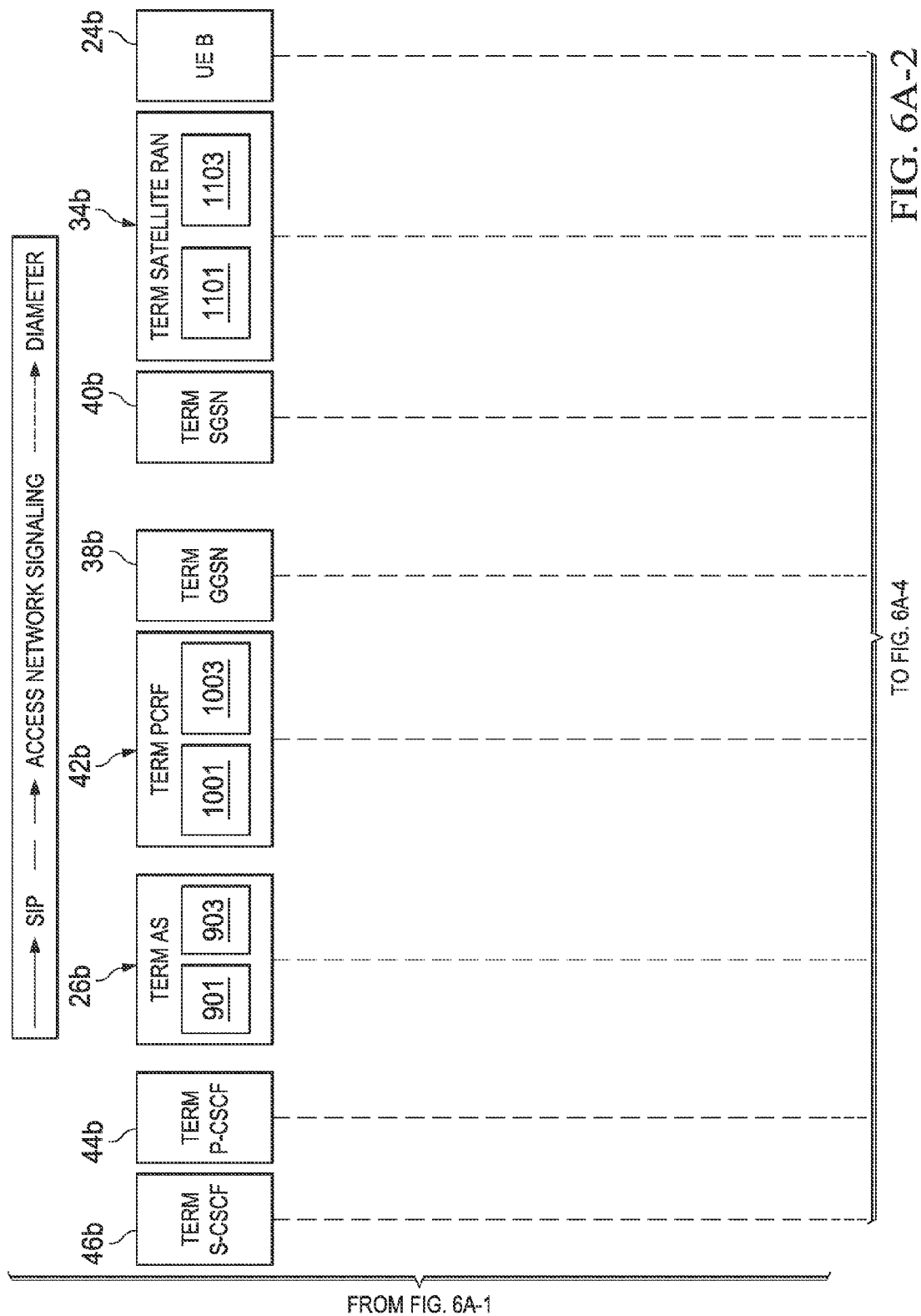

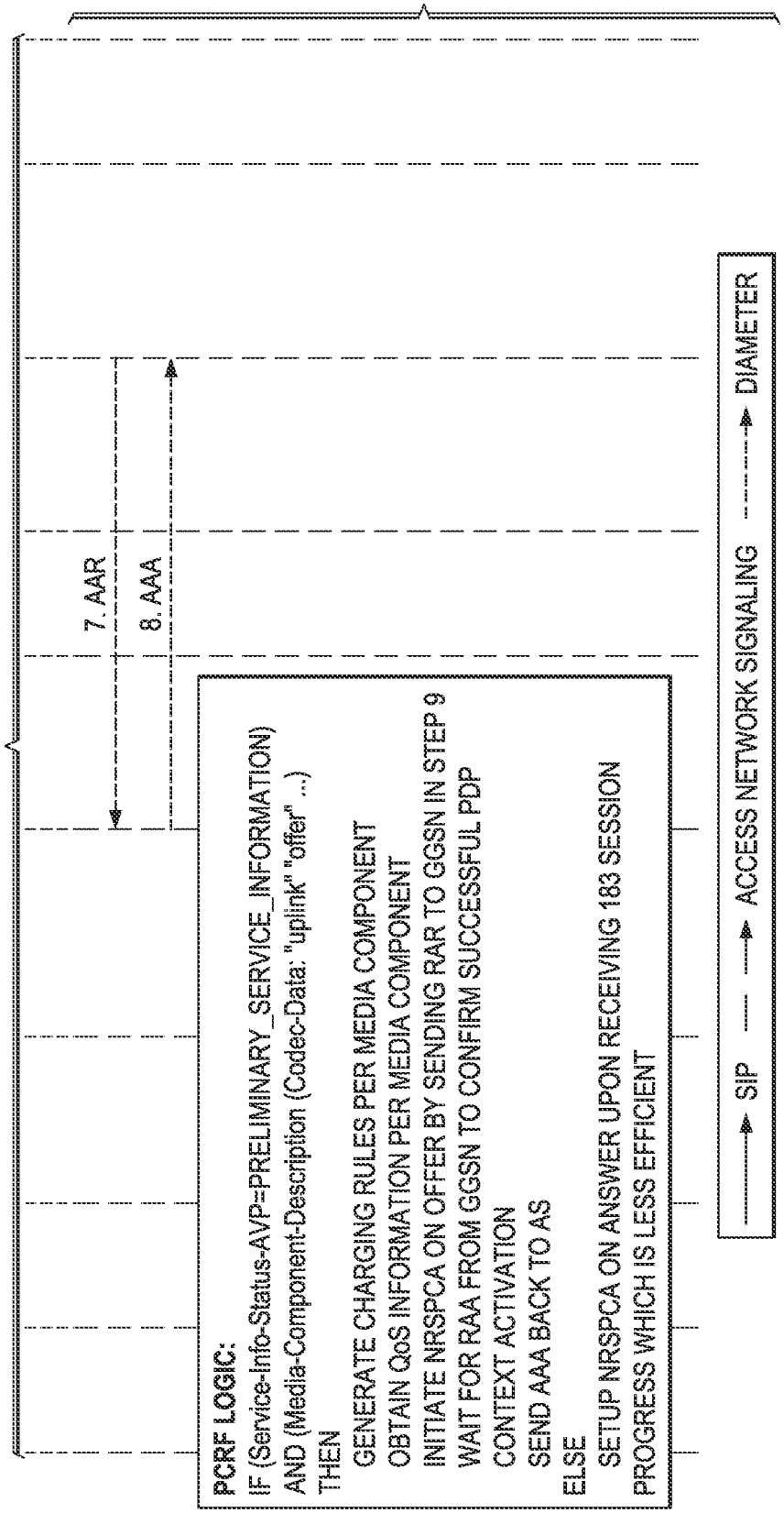

FIG. 6A-4

FROM FIG. 6A-2

FROM FIG. 6A-3

→ SIP        ---→ ACCESS NETWORK SIGNALING        ·····→ DIAMETER

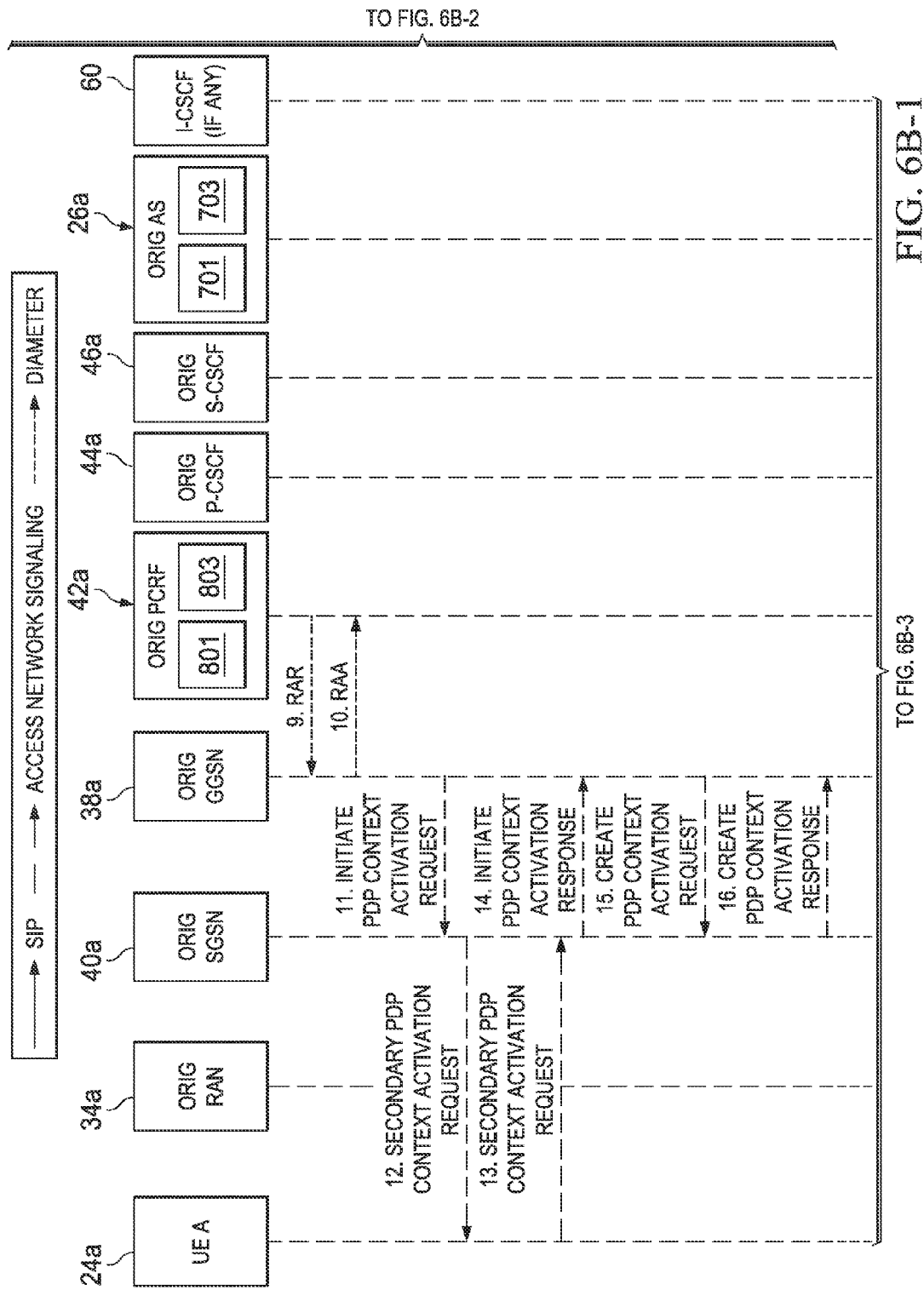

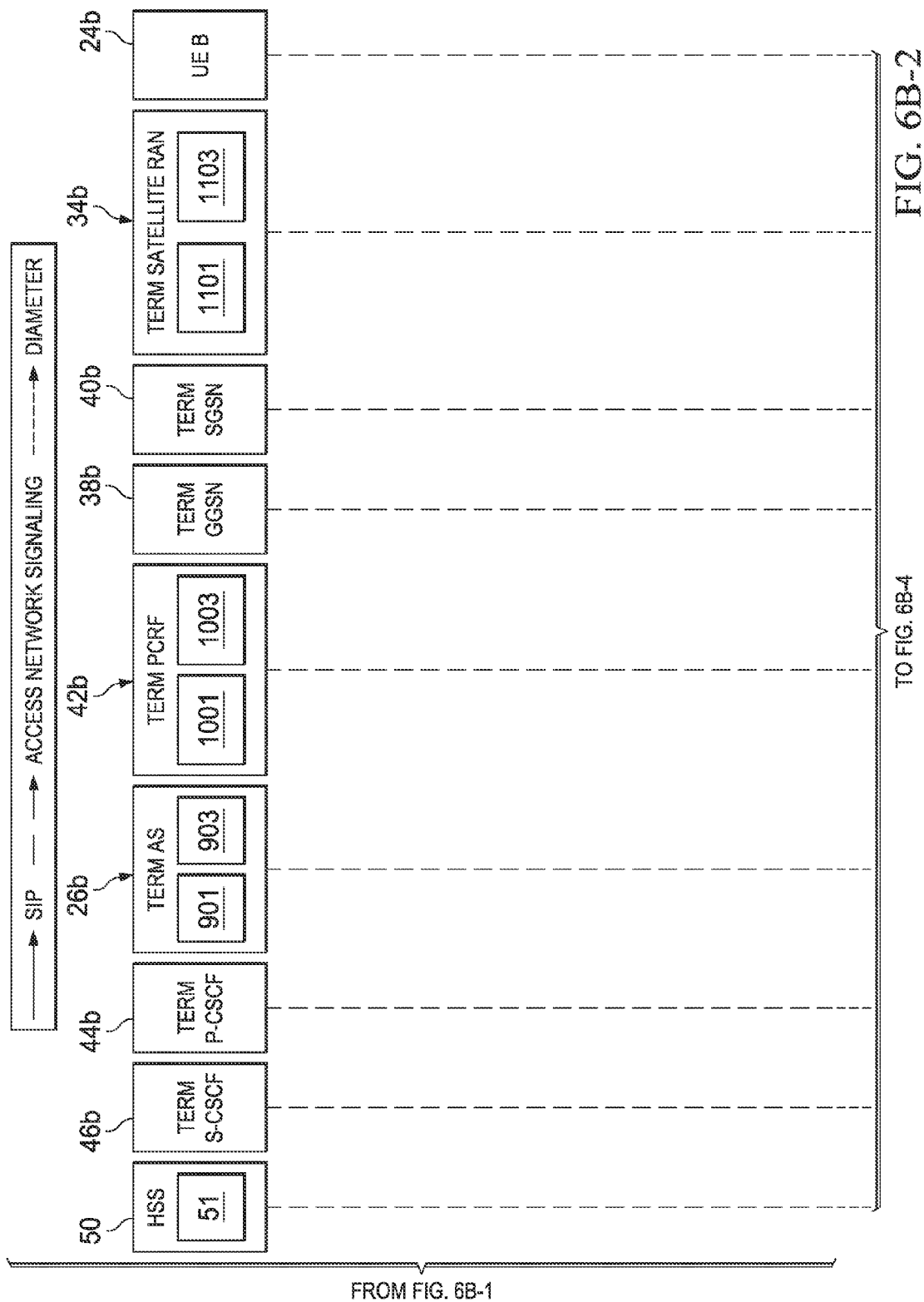

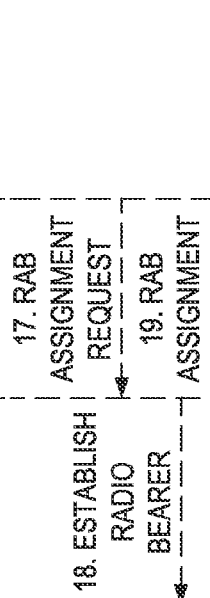

FIG. 6B-4

FROM FIG. 6B-2

FROM FIG. 6B-3

SIP ⟶ ACCESS NETWORK SIGNALING ⟶ DIAMETER

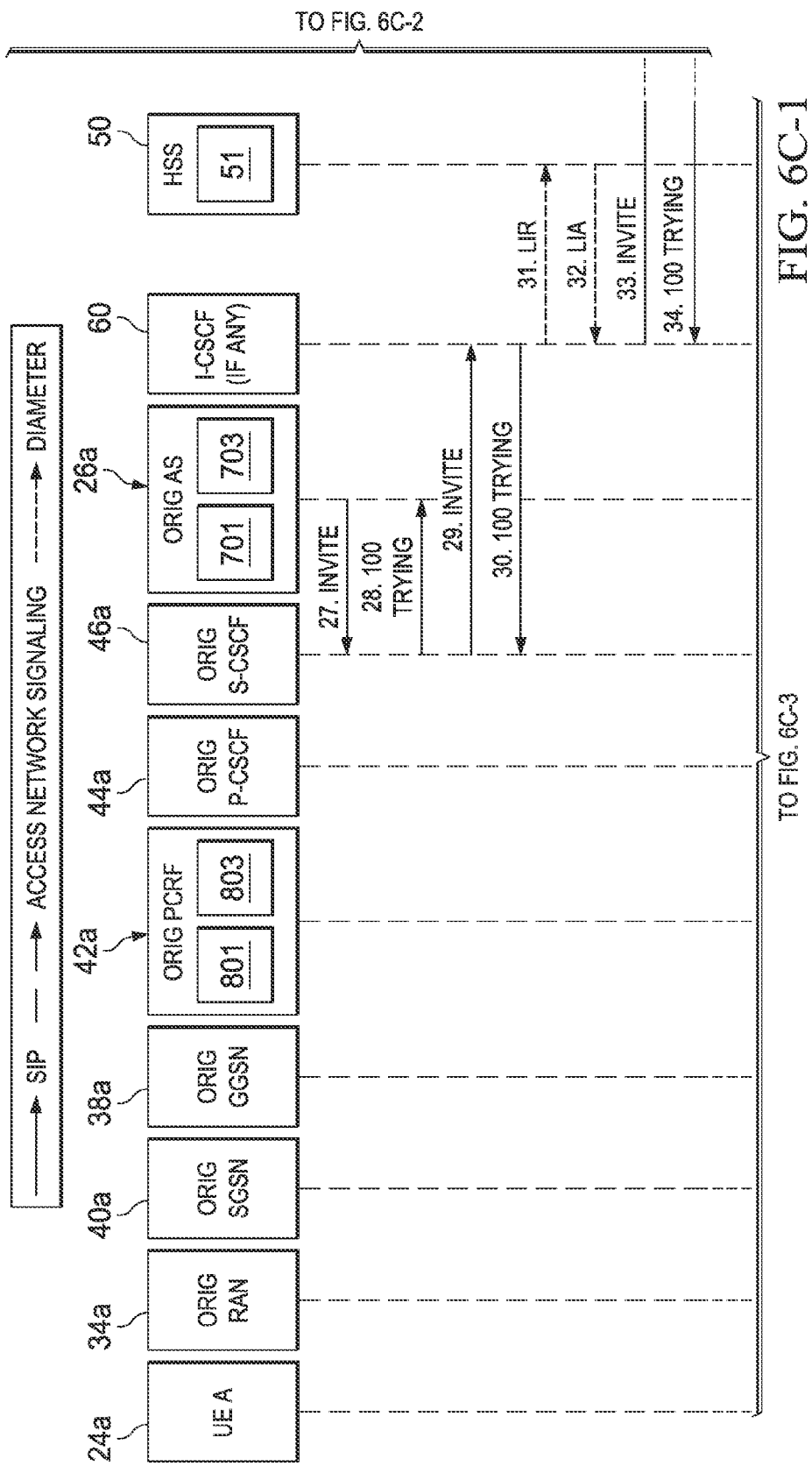

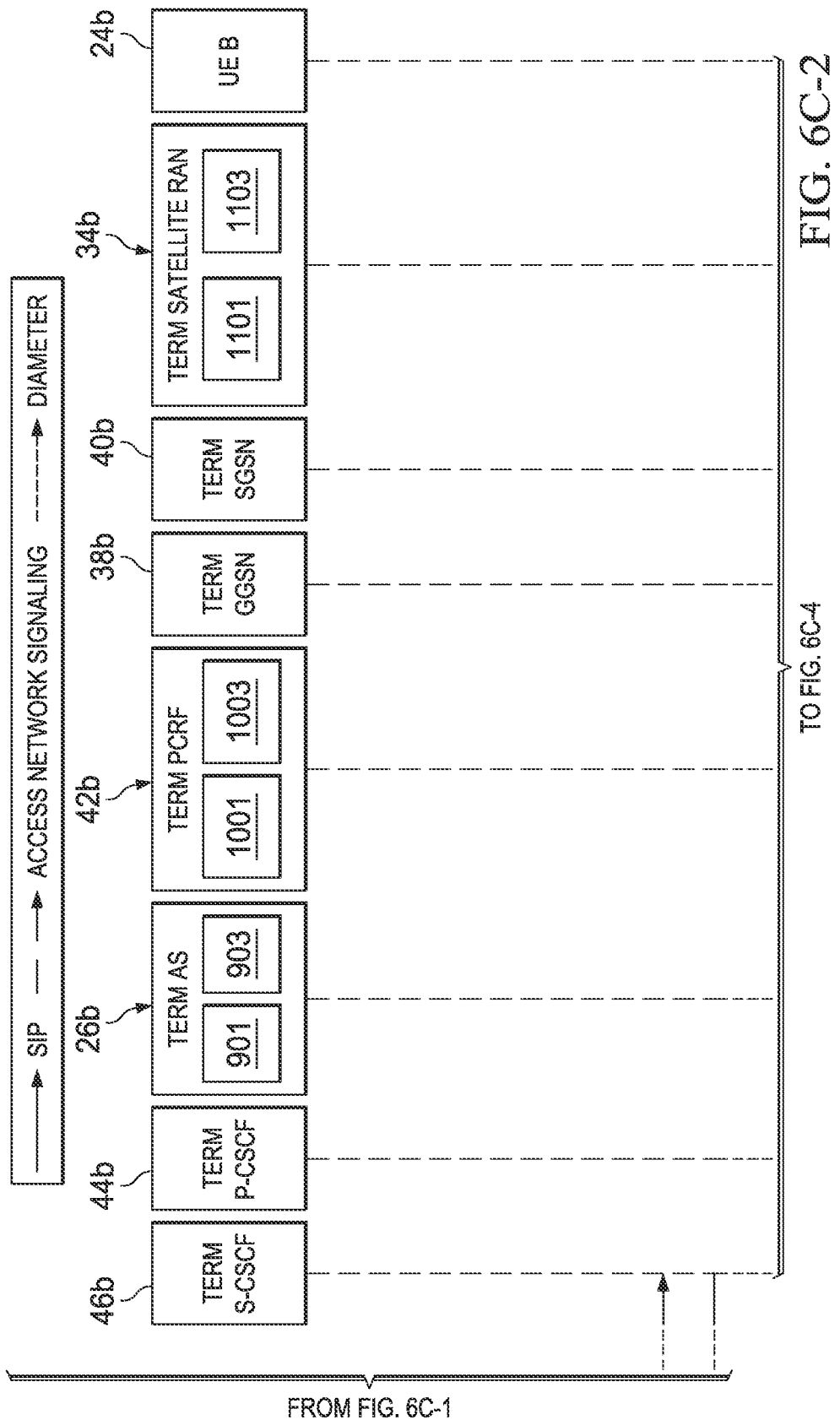

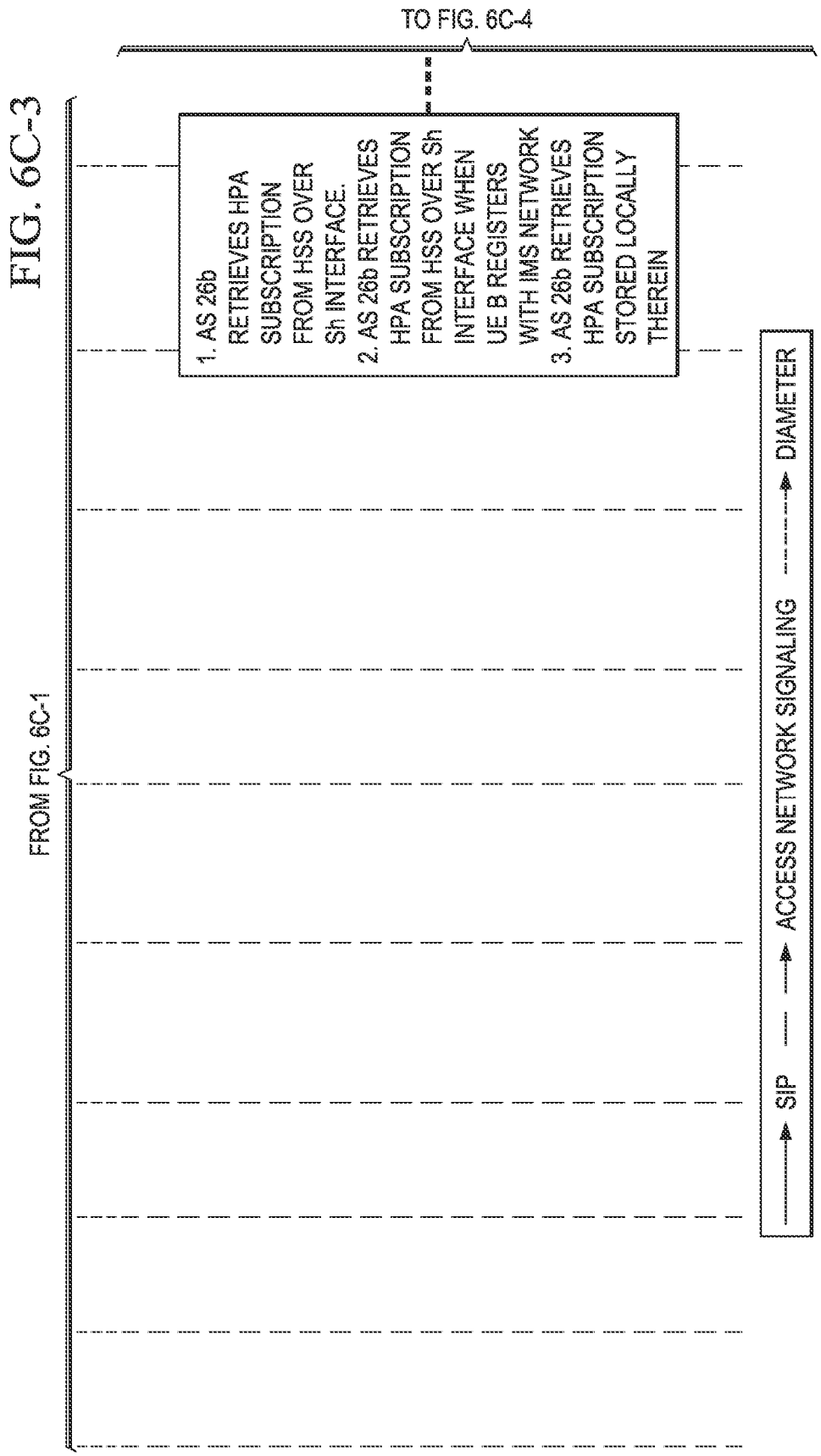

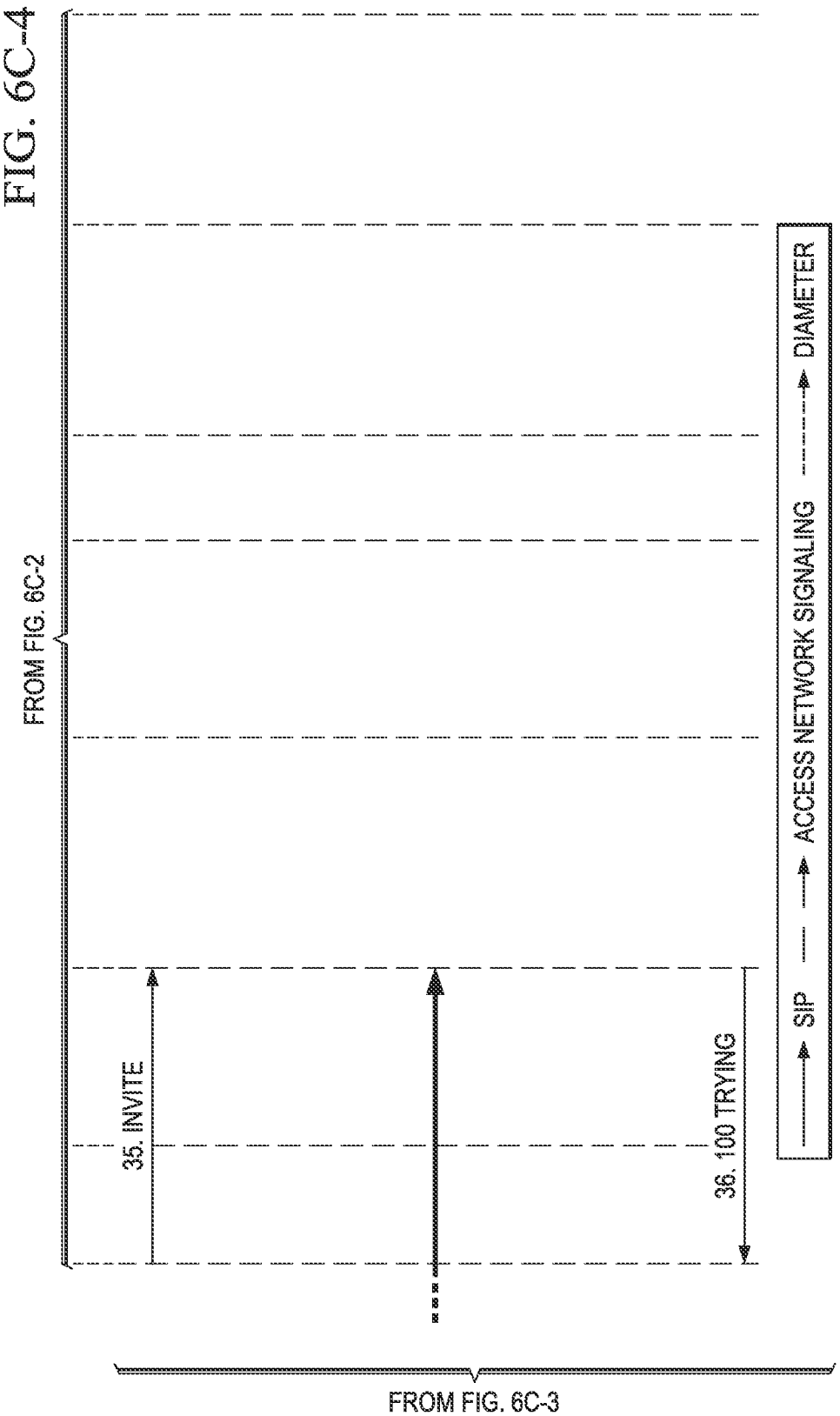

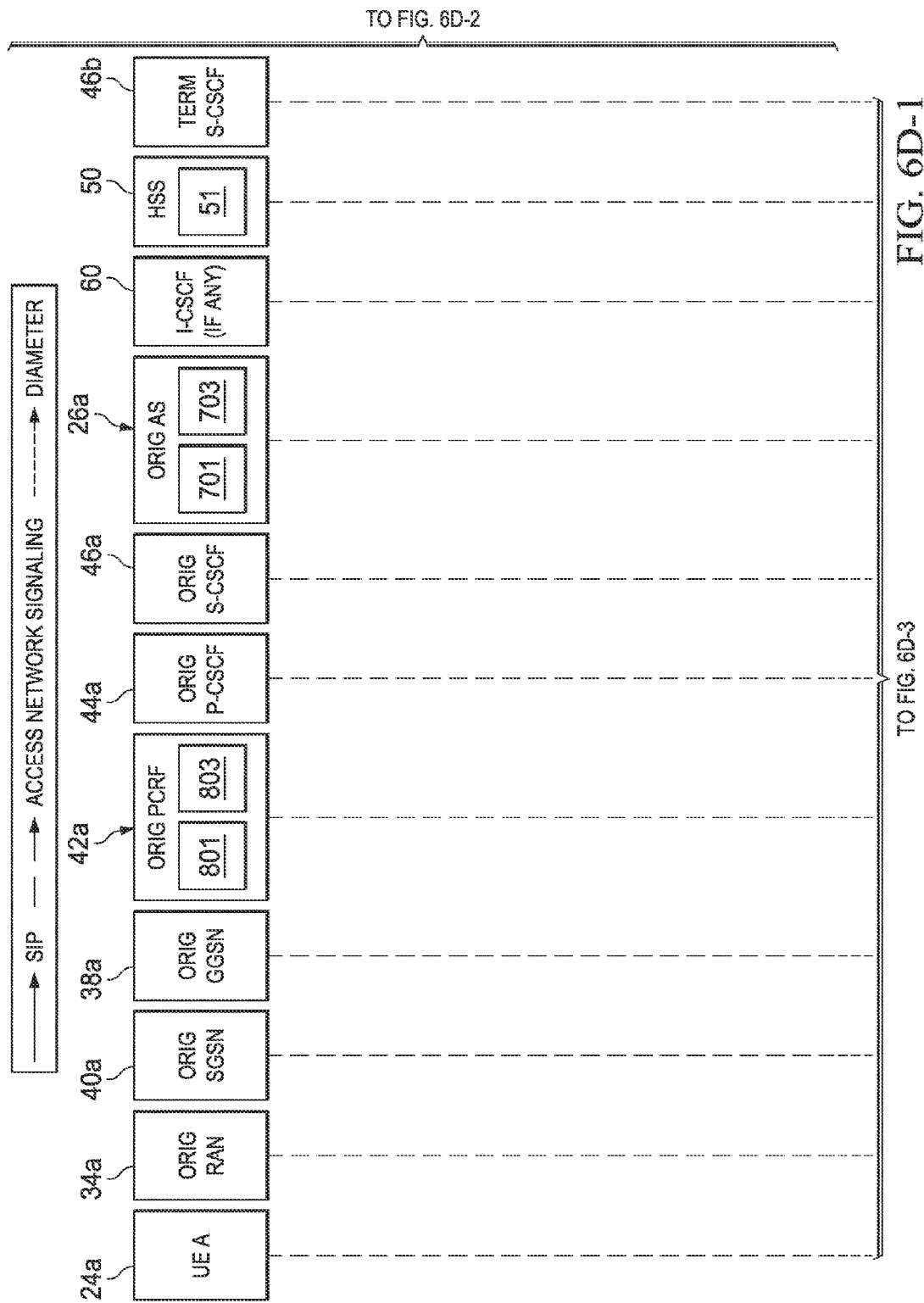

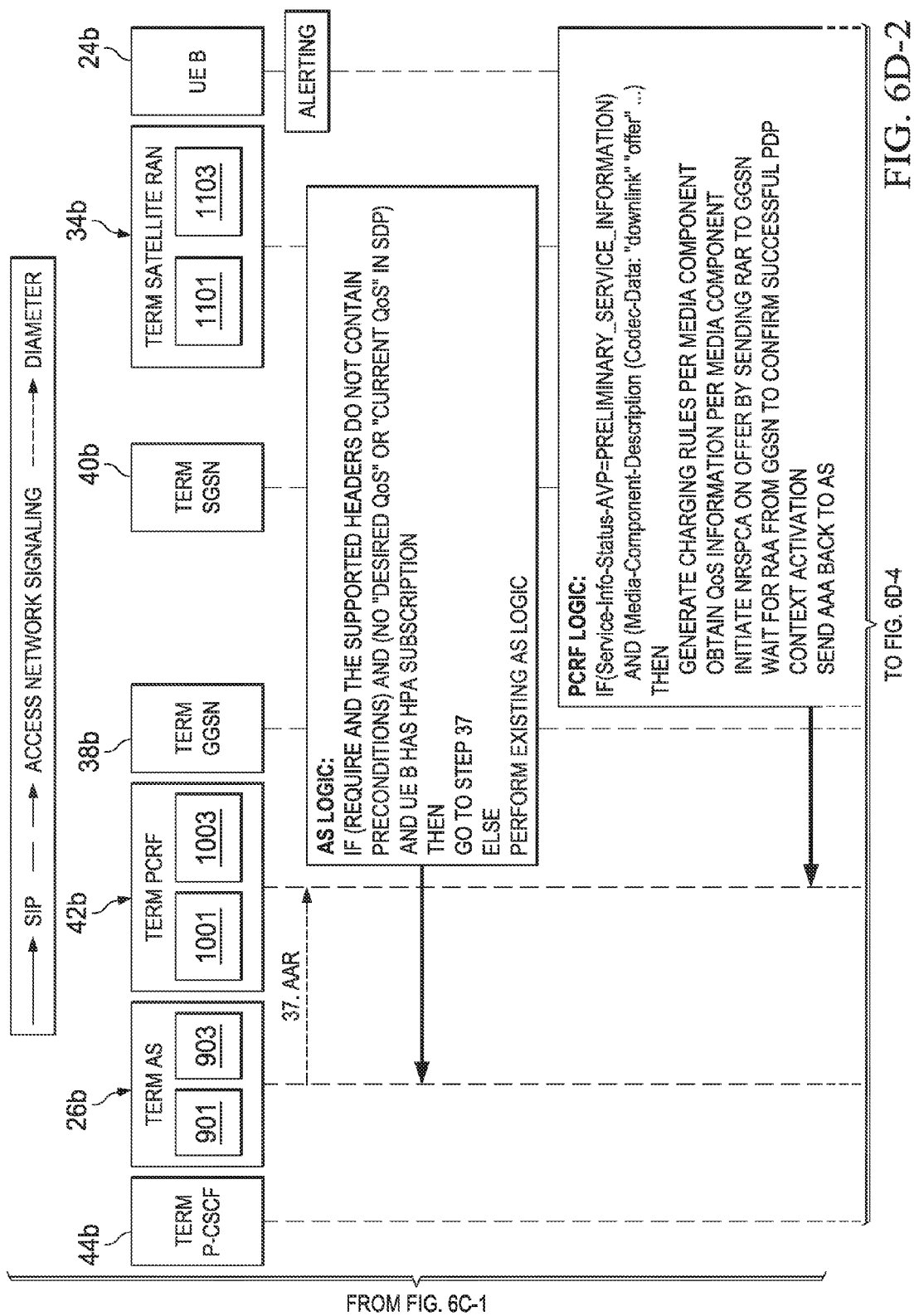

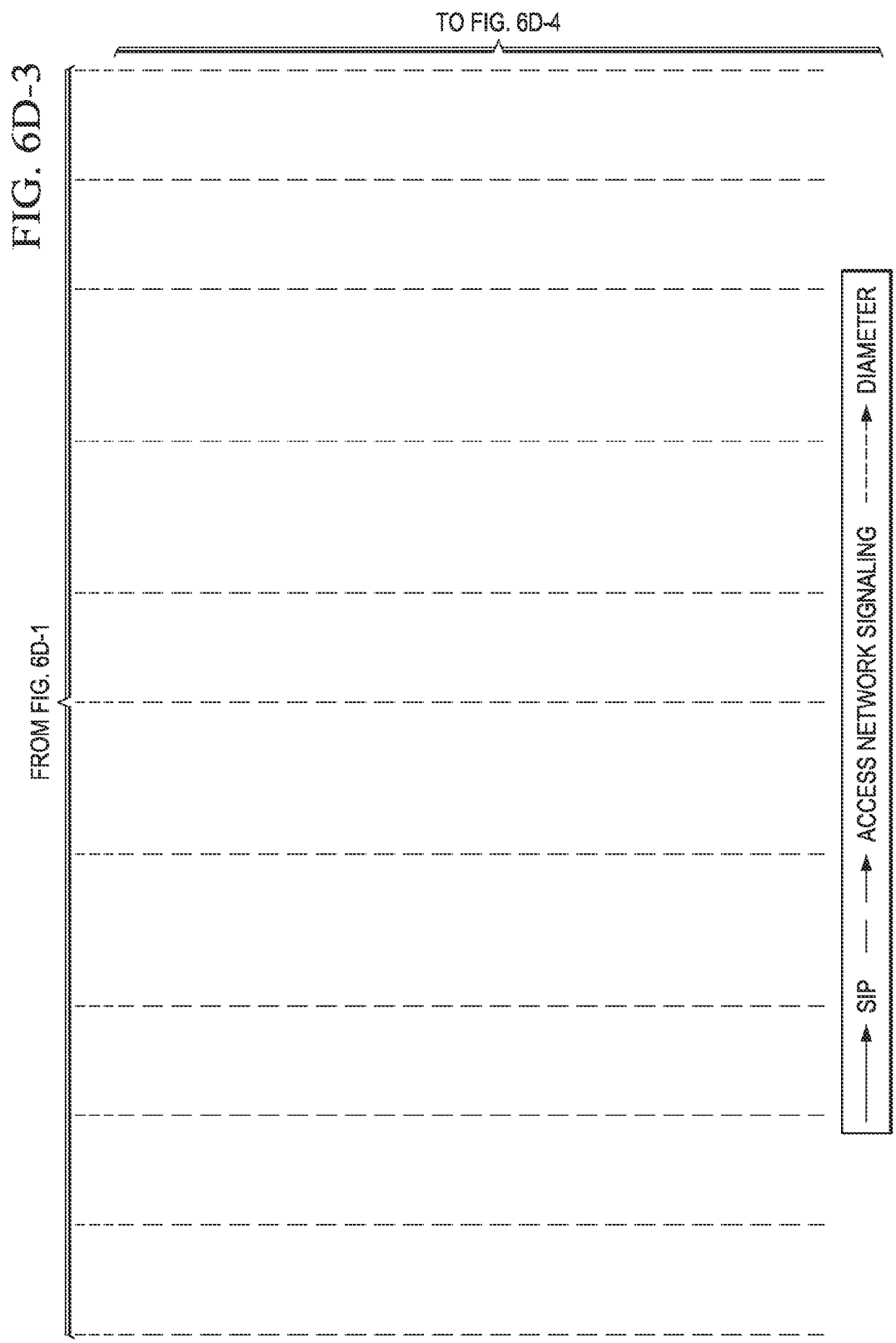

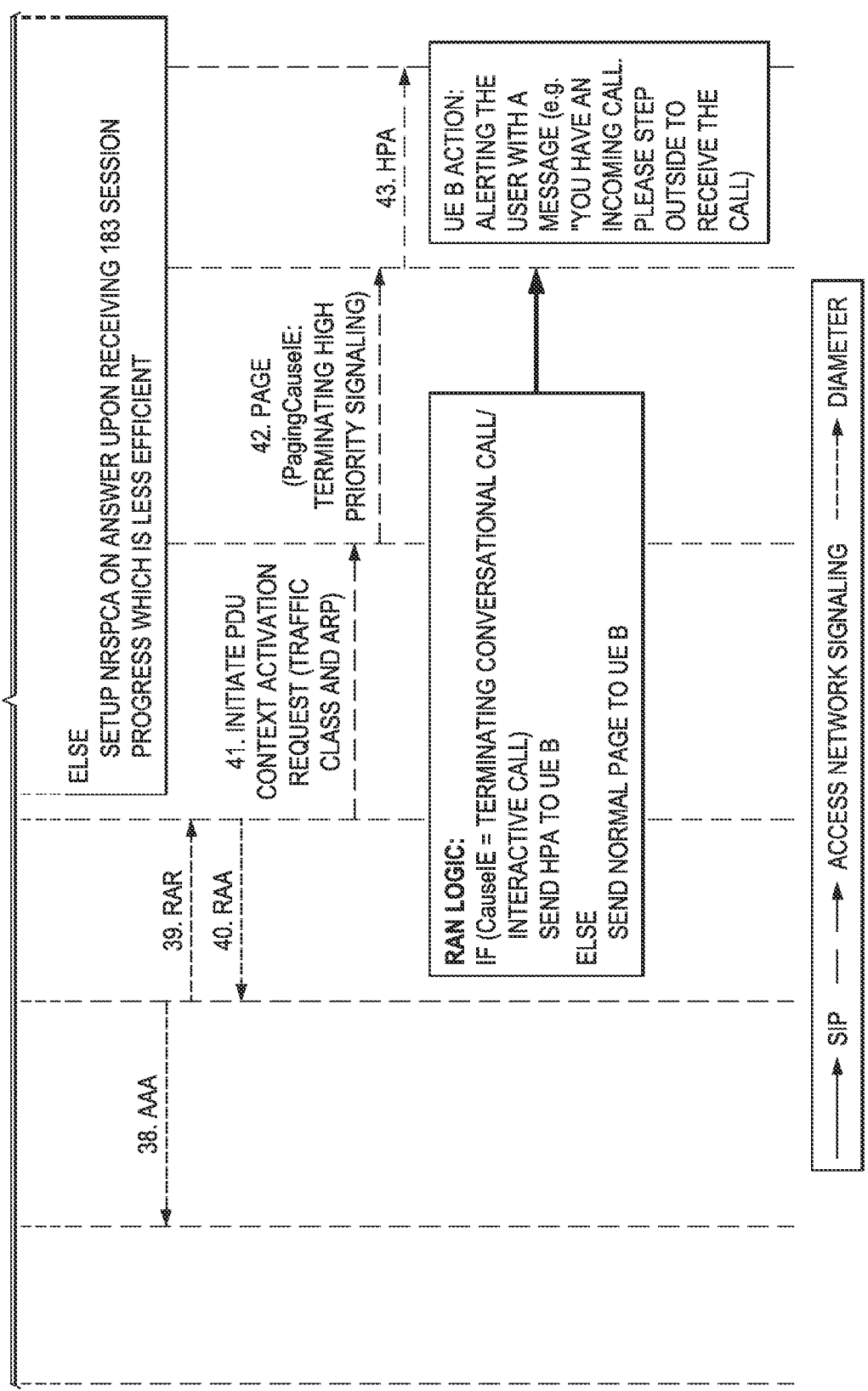

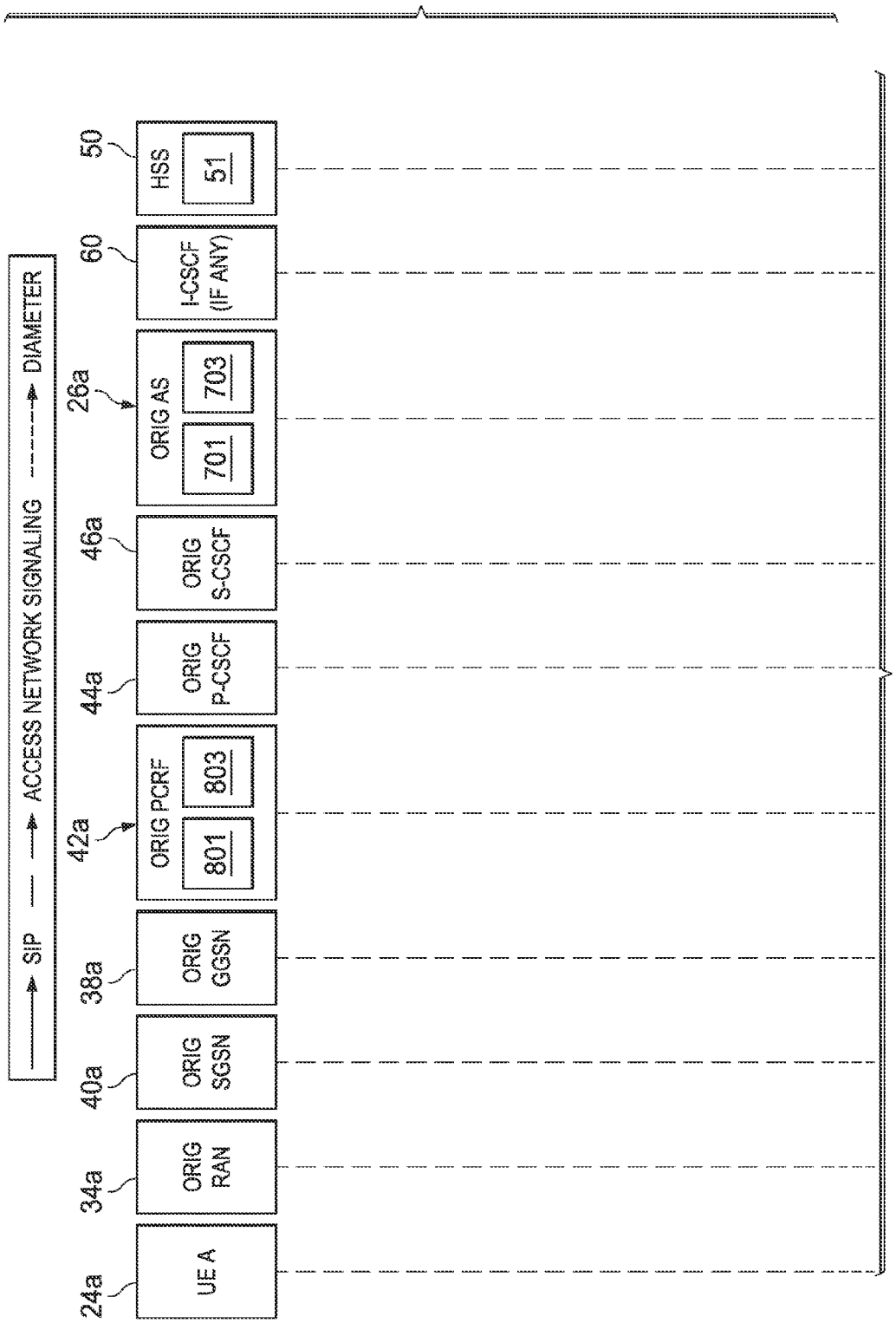

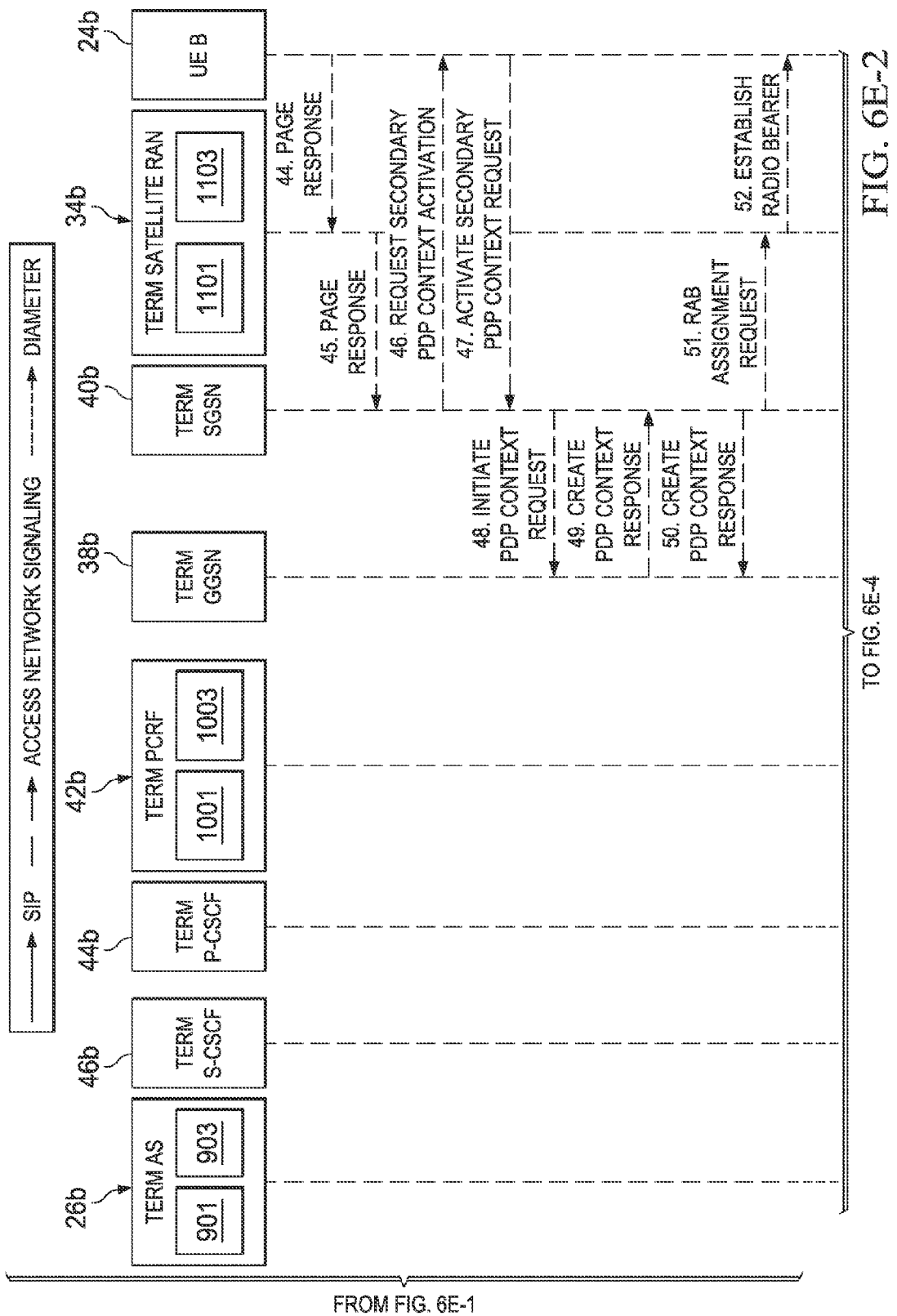

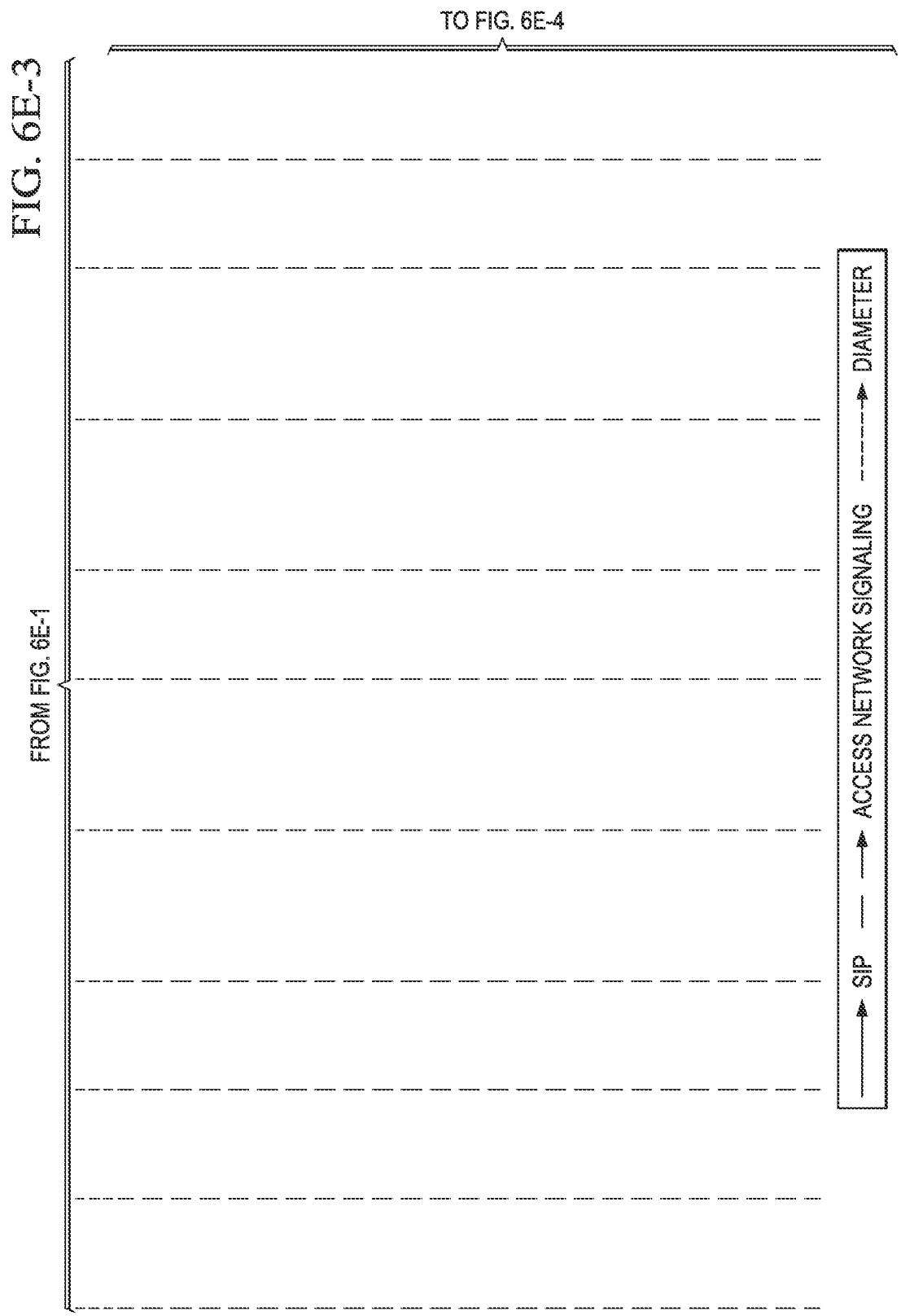

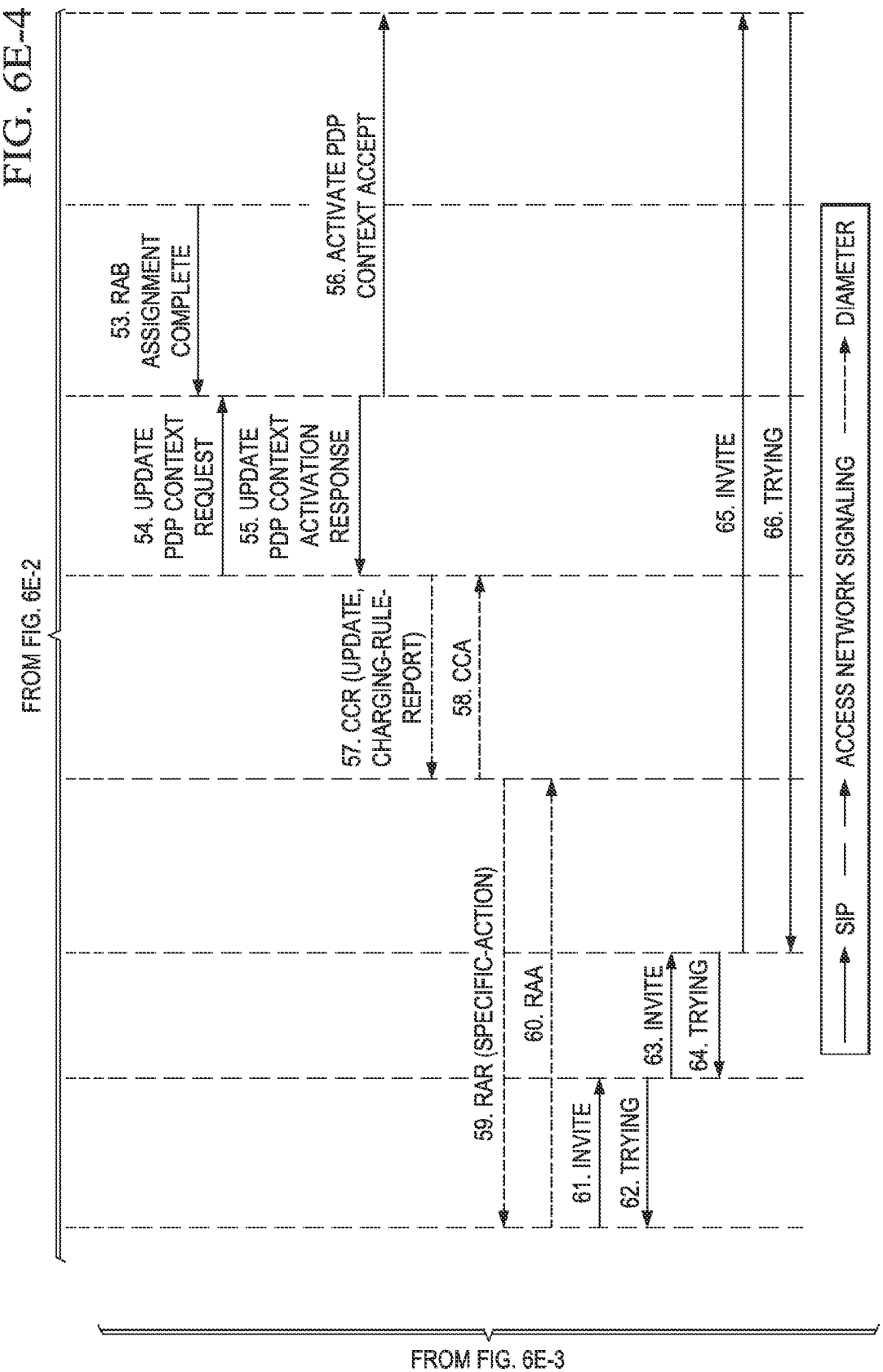

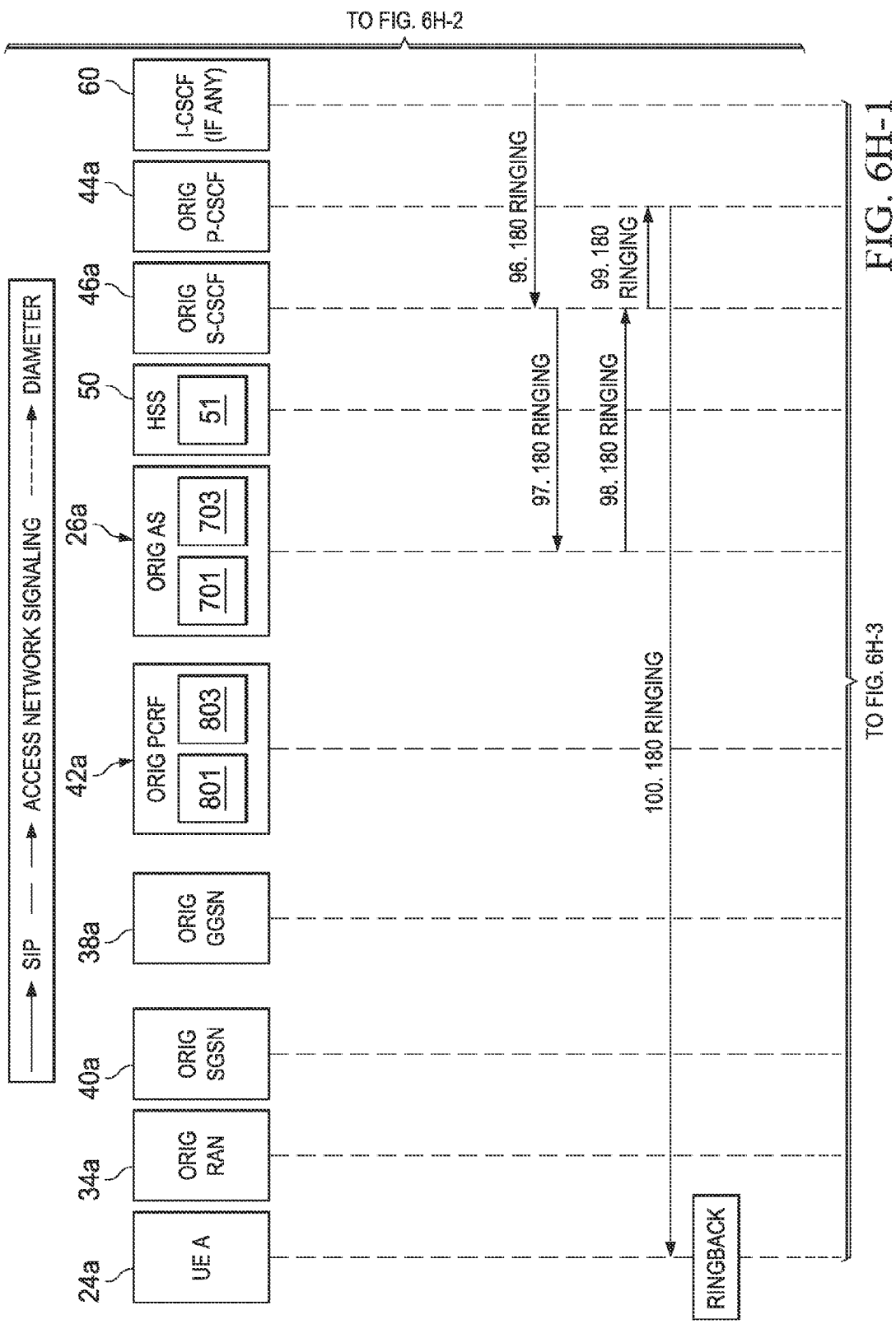

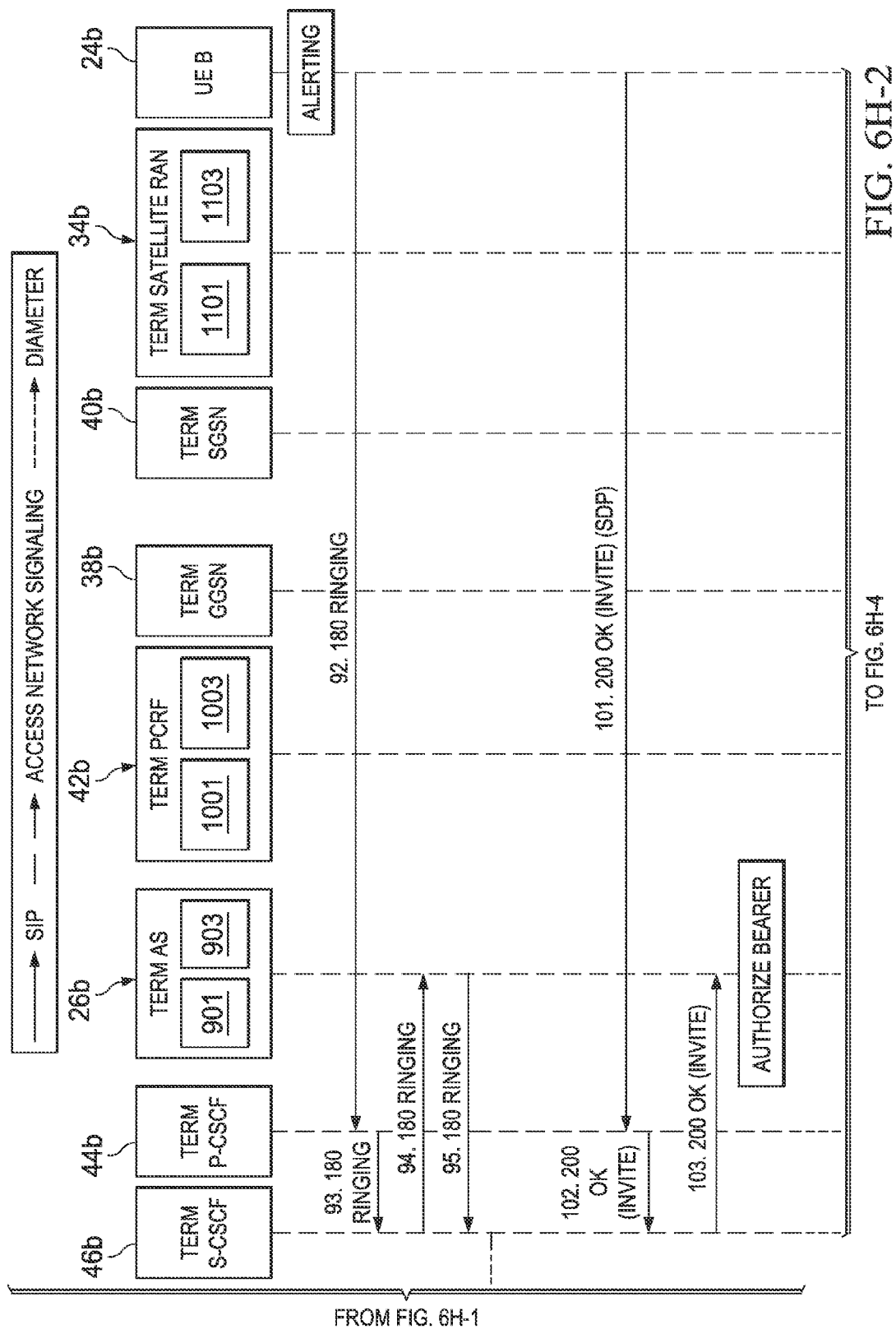

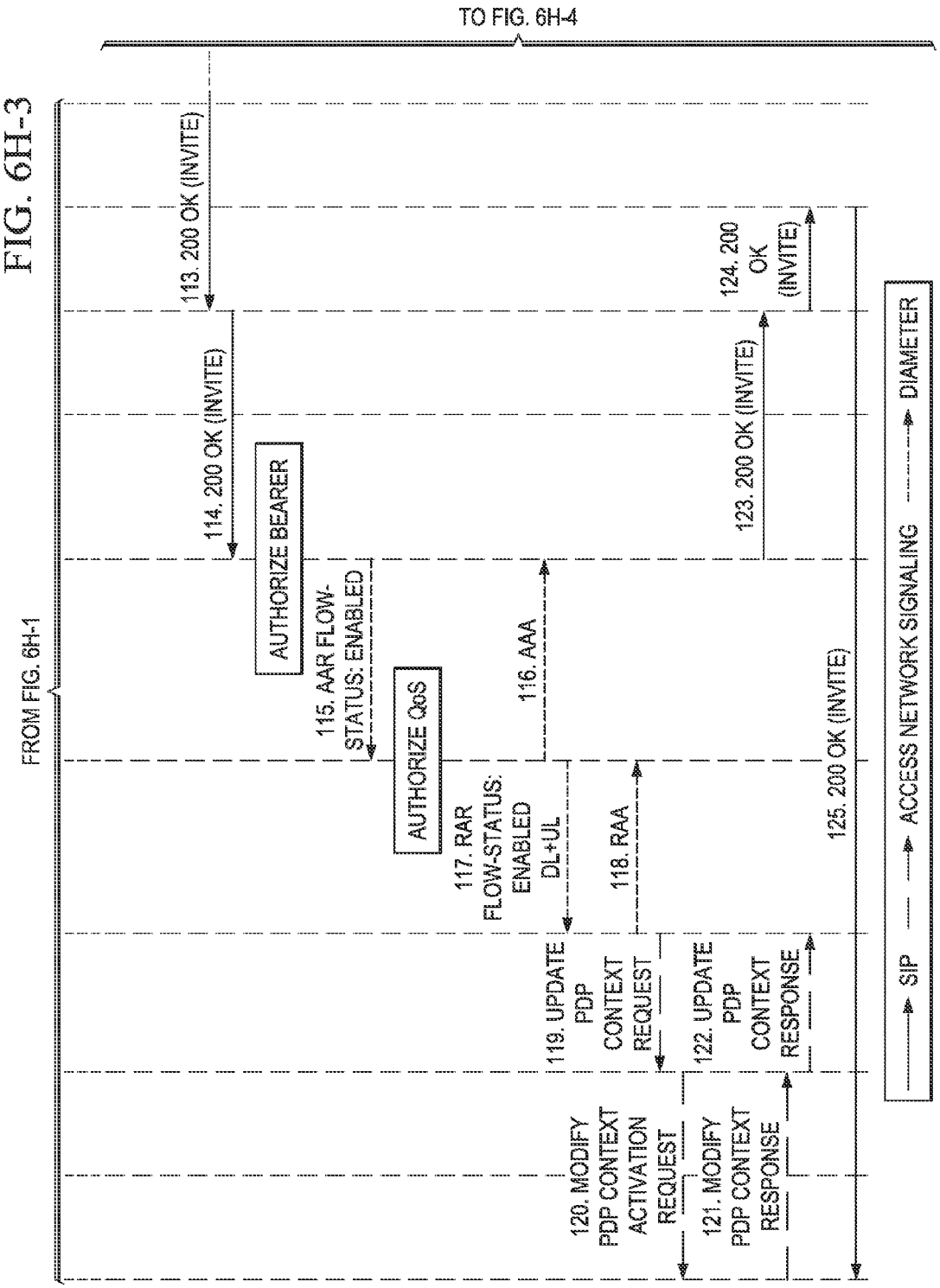

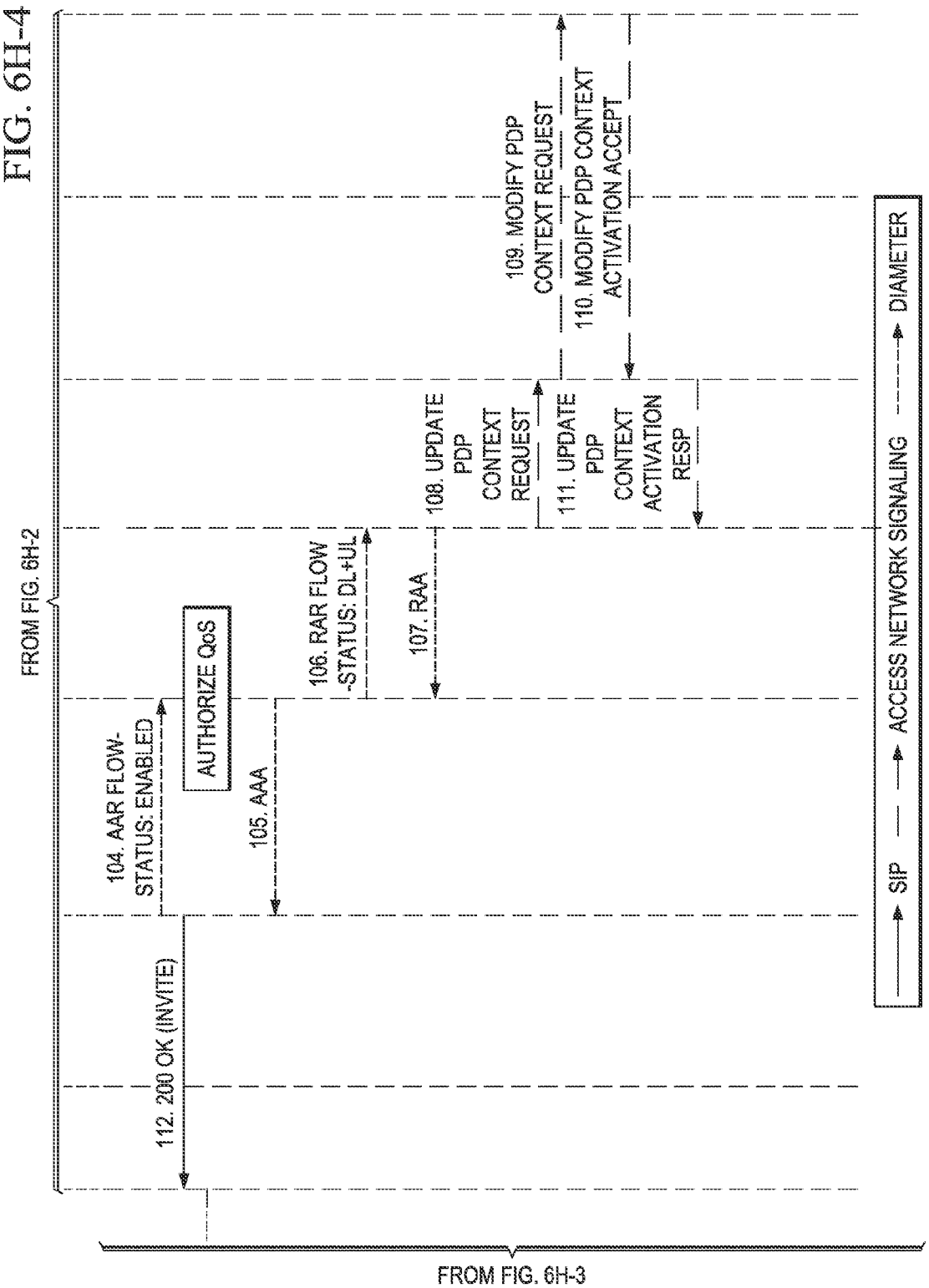

CALL ESTABLISHMENT OPTIMIZATION FOR IMS BASED MOBILE SATELLITE SYSTEM

CLAIM OF PRIORITY

This application claims the benefit U.S. Provisional Application Ser. No. 61/644,190 filed on May 8, 2012. The contents of this document are incorporated by reference herein.

RELATED PATENT APPLICATION

This application is related to co-assigned U.S. Publication No. 2011/0075655 A1 which is entitled "Method to Optimize Call Establishment in Mobile Satellite Communication System". The contents of this document are incorporated by reference herein.

TECHNICAL FIELD

The present invention relates generally to telecommunication systems, and in particular to IMS nodes and a satellite RAN which are operative to establish certain calls (e.g., voice calls) with reduced latency and selectively using a High Penetration Alert (HPA) page to reach a terminating satellite UE.

BACKGROUND

The following abbreviations are herewith defined, at least some of which are referred to within the following description of the prior art and the present invention.
3GPP Third Generation Partnership Project
AAA Authentication, Authorization and Accounting, Diameter AA-Answer
AAR Diameter AA-Request
ARP Allocation Retention Priority
AS Application Server
AVP Attribute-Value Pair
CCA Credit-Control-Answer
CCR Credit-Control-Request
CSCF Call Session Control Function
Cx Name for interface between CSCF and HSS
DHCP Dynamic Host Configuration Protocol
DNS Domain Name System
ENUM Electronic Numbering
HLR Home Location Register
HPA High Penetration Alert
H-PLMN Home-Public Land Mobile Network
HSS Home Subscriber Server
IETF Internet Engineering Task Force
iFC initial Filter Criteria
IP-CAN IP Connectivity Access Network
IMS IP Multimedia Subsystem
ISC Name of interface between S-CSCF and HSS
MGCF Media Gateway Controller Function
MGW Media Gateway
MRFC Media Resource Function Controller
MRFP Media Resource Function Processor
NRSPCA Network Initiated Secondary PDP Context
PCC Policy and Charging Control
P-CSCF Proxy CSCF (see CSCF)
PCRF Policy and Charging Rule Function
PSTN Public Switched Telephony Network
RAA Diameter Re-Auth-Answer
RAB Radio Access Bearer
RADIUS Remote Authentication Dial-In User Service
RAR Diameter Re-Auth-Request
RTP Real-Time Transport Protocol
Rx Name of interface between AF/AS and PCRF
S-CSCF Serving CSCF (see CSCF)
SGW Signaling Gateway
Sh Name of interface between AS and HSS
SIP Session Initiation Protocol
UE User Equipment
URI Universal Resource Indicator
V-PLMN Visited-Public Land Mobile Network
WCDMA Wide Band Code Division Multiple Access The IP Multimedia Subsystem (IMS), as defined by the 3$^{rd}$ Generation Partnership Project (3GPP) standards body, merges telephony and Internet technology by providing an all-IP based architecture for the telecommunications industry. The IMS is based on the Session Initiation Protocol (SIP) and makes heavy use of the protocols defined within the IETF. IMS offers a network of servers and databases that assist a user agent with the task of establishing and managing sessions. IMS uses the term sessions because the connections between users are no longer limited to voice services (a phone call). Sessions may be voice, video, text, or other services connecting two or more user agents together. A representative IMS network is depicted in FIG. 1 (PRIOR ART).

Communications between nodes within an IMS network utilize the Session Initiation Protocol (SIP). SIP is a signaling protocol for Internet conferencing, telephony, presence, events notification, instant messaging, and the like. SIP signaling uses a long-term stable identifier, the SIP Universal Resource Indicator (URI). User equipment (UE) in an IMS refers to a device that contains the SIP User Agent that will initiate or terminate SIP sessions. In particular, one form of UE is a mobile terminal operative to send and receive data across a defined air interface, such as Wideband Code Division Multiple Access (WCDMA).

SIP signaling packets in an IMS network are processed by SIP servers or proxies collectively called Call Session Control Function (CSCF). Different types of CSCFs perform specific functions.

A Proxy-CSCF (P-CSCF) is a SIP proxy that is the first point of contact for an IMS terminal (UE). The P-CSCF may reside in the terminal's H-PLMN or a V-PLMN. In either case, a P-CSCF is assigned to a UE during registration, which does not change for the duration of the registration. All SIP messages to and from the UE pass through the P-CSCF, which can inspect them. The P-CSCF performs authentication and security functions for the UE, and maintains records of communications for billing.

A Serving-CSCF (S-CSCF) is the central SIP proxy in a UE's H-PLMN that performs SIP services and session control. Based on information from a Home Subscriber Server (HSS) database, the S-CSCF handles SIP registrations, in which it binds the UE IP address to a SIP address. The S-CSCF also can intercept and inspect all SIP messages to and from the UE. The S-CSCF decides to which application server (AS) the SIP messages will be forwarded, to obtain their services. The S-CSCF also provides routing services, typically using Electronic Numbering (ENUM) lookups, and it enforces network operator policies.

An Interrogating-CSCF (I-CSCF) is a SIP proxy located at the edge of an administrative domain. The IP address of the I-CSCF is published in the Domain Name System (DNS) of the domain, so that remote servers can find it, and use it as a forwarding point for SIP packets into the I-CSCF's domain. The I-CSCF retrieves the subscriber location from the HSS, and then routes SIP requests to its assigned S-CSCF.

An IMS network includes a Home Subscriber Server (HSS) that stores the relevant user data including authentication information and service data. As part of the user profile, initial Filter Criteria (iFC) are defined to indicate which application servers are to be invoked based on information in the signaling plane.

An IMS network also includes one or more Application Servers (AS) providing various services, such as audio and video broadcast or streaming, push-to-talk, videoconferencing, games, file sharing, e-mail, and the like. Application Servers are invoked based on the iFCs that are stored in the user profile. The S-CSCF will pass signaling onto an AS if the criteria defined in the iFC are met. Once invoked, the AS can take part in the session and provide additional capabilities.

FIG. 1 (PRIOR ART) is a simplified functional block diagram of an exemplary IMS network 10. A UE 12 (incorporating a SIP agent 13) has associated with it one or more CSCFs (e.g., a P-CSCF, S-CSCF, and/or I-CSCF) 14. The CSCF 14 is connected to one or more various ASs 16 and 18 providing services. A HSS 20 (which stores UE authorization information 21 and user profile/iFCs 22) provides information for Authentication, Authorization and Accounting (AAA) functions.

The Diameter protocol is an advanced, extensible AAA protocol, derived from the industry standard RADIUS (Remote Authentication Dial-In User Service) protocol. Diameter includes numerous enhancements to RADIUS, such as error handling and message delivery reliability. It extracts the essence of the AAA protocol from RADIUS and defines a set of messages that are general enough to form the core of a Diameter base protocol. The various applications that require AAA functions can define their own extensions on top of the Diameter base protocol, and can benefit from the general capabilities provided by the Diameter base protocol.

FIG. 2 (PRIOR ART) depicts a representative prior art call flow for a UE to UE call, in which preconditions are used to avoid a problem known as "ghost ringing." This is accomplished by ensuring that radio resources are reserved on the calling party's side (UE #1) before alerting the called party (UE #2). The call flow with preconditions of FIG. 2 (PRIOR ART) is extracted from section 5.1.2.3 of 3GPP TR 24.930 V.7.5.0, the disclosure of which is incorporated herein by reference in its entirety. Hence, a skilled person would readily understand steps 201-244 where only the steps relevant to the discussion herein are described.

When the called and calling UEs are mobile satellite terminals, the call flow of FIG. 2 (PRIOR ART) presents several problems. First, if the called UE #2 is located where there is no satellite coverage, such as inside a building, the SIP INVITE message at step 207 will never reach the called UE #2 unless the satellite initiates a High Penetration Alert (HPA) page. The HPA page is a paging message transmitted at much higher power than a normal page. The HPA page directs the called UE #2 to display a message asking the called party to exit the building (or otherwise move into an area of satellite coverage) to receive the call. One solution is for the satellite Radio Access Network (RAN) (not shown) to send a HPA page on every SIP INVITE, regardless of session establishment type (e.g. voice calls, messaging). However, this approach severely impacts radio resources.

Additionally, the codec negotiation of steps 217 to 232 result from Network Requested Secondary PDP Context Activation (NRSPCA) on Answer that is, no PDP context is established until the called UE #2 is reached via initial SIP signaling. While NRSPCA on Answer has some advantages in terrestrial networks, such as ensuring that network resources are available and reserved prior to connecting the call, it entails extensive SIP messaging between the two UEs. When a call is established over a satellite, the voluminous exchange of SIP messages not only consumes satellite link bandwidth, it also increases the call setup time.

SUMMARY

According to one or more embodiments of the present invention described and claimed herein, call placement to or from satellite UEs is optimized by reducing IMS message exchanges, the originating party has control over QoS parameters, a HPA subscription service is made available, and calls to a terminating satellite UE that is shielded from satellite coverage are completed by selectively employing HPA pages. For a call request without preconditions, an AS (originating AS) associated with an originating UE interacts with the PCRF (originating PCRF) to initiate a NRSPCA on Offer instead of using the standard NRSPCA on Answer. An AS (terminating AS) associated with a terminating satellite UE checks for HPA subscription by the user of the terminating satellite UE. If subscribed, the AS (terminating AS) associated with the terminating satellite UE interacts with the PCRF (terminating PCRF) to (1) initiate an NRSPCA on Offer and (2) initiate transmission of a HPA page to the terminating satellite UE.

One embodiment relates to an originating AS and method implemented by the same for establishing a call between an originating UE and a terminating satellite UE. The originating AS comprises at least a processor and a memory that stores processor-executable instructions where the processor interfaces with the memory and executes the processor-executable instructions to enable at least the following steps 1 and 2. At step 1, the originating AS receives from the originating access network (e.g., S-CSCF) a SIP INVITE message which is associated with the call for the terminating satellite UE. At step 2, the originating AS sends to the originating PCRF an AAR message to initiate a NRSPCA on Offer to establish a secondary PDP context between the originating access network and the originating UE via the originating RAN. In one embodiment, the AAR message is sent by the originating AS to the originating PCRF only if a Require header field and a Supported header field in the received SIP INVITE message do not contain preconditions and a SDP portion of the SIP INVITE message does not contain "desired QoS" and "current QoS." If desired, the AAR message may further include an AVP which indicates to the originating PCRF that the call requires NRSPCA on Offer such that the PCRF delays sending an AAA message back to the AS until the originating PCRF receives an indication of successful secondary PDP context activation from the originating access network (e.g., GGSN). An advantage of this is that the originating AS helps reduce IMS message exchanges.

Another embodiment relates to an originating PCRF and method implemented by the same for establishing a call between an originating UE and a terminating satellite UE. The originating PCRF comprises at least a processor and a memory that stores processor-executable instructions where the processor interfaces with the memory and executes the processor-executable instructions to enable at least the following steps 1, 2, 3, 4, 5, 6, 7, and 8. At step 1, the originating PCRF receives from the originating AS an AAR to initiate a NRSPCA on Offer to establish a secondary PDP context between the access network and the originating UE via the originating radio access network. At step 2, the originating PCRF determines if the AAR indicates the NRSPCA on Offer. If the result of the determine step 2 is that the AAR does indicate the NRSPCA on Offer, then the originating PCRF performs the following steps: (a) generate charging rules per media component (step 3); (b) obtain QoS information per media component (step 4); (c) initiate the NRSPCA on Offer by sending a RAR message to the originating access network (e.g., GGSN) (step 5); (d) wait to receive a RAA message from the originating access network (e.g., GGSN) which confirms establishment of the secondary PDP context between the originating access network and the originating UE via the originating radio access network (step 6); (e) upon receipt of the RAA message from the originating access network (e.g., GGSN), send an AAA message back to the originating AS (step 7). If the result of the determine step 2 is that the AAR does not indicate the NRSPCA on Offer, then the originating PCRF sets up a NRSPCA on Answer (step 8). An advantage of this is that the originating PCRF helps reduce IMS message exchanges.

Another embodiment relates to a terminating AS and method implemented by the same for establishing a call between an originating UE and a terminating satellite UE. The terminating AS comprises at least a processor and a memory that stores processor-executable instructions where the processor interfaces with the memory and executes the processor-executable instructions to enable at least the following steps 1, 2, 3 and 4. At step 1, the terminating AS receives from the terminating access network (e.g., S-CSCF) a SIP INVITE message associated with the call for the terminating satellite UE. At step 2, the terminating AS retrieves a HPA subscription if any associated with the terminating satellite UE. For instance, the terminating AS upon receiving the SIP INVITE message can retrieve the HPA subscription from the HSS over the Sh interface (step 2a). Or, the terminating AS can retrieve the HPA subscription from the HSS over the Sh interface when the UE B first registers with IMS network (step 2b). Alternatively, the terminating AS can retrieve the HPA subscription which is stored locally in the terminating AS (step 2c). At step 3, the terminating AS upon determining that the terminating satellite UE has the HPA subscription operates to send the terminating PCRF an AAR message to (1) initiate a NRSPCA on Offer to establish a secondary PDP context between the terminating access network and the terminating satellite UE via the terminating satellite radio access network, and (2) initiate transmission of a HPA page to the terminating satellite UE. In one embodiment, the terminating AS sends the AAR message to the terminating PCRF only if the terminating satellite UE has the HPA subscription and a Require header field and a Supported header field in the received SIP INVITE message do not contain preconditions and a SDP portion of the SIP INVITE message does not contain "desired QoS" and "current QoS." If desired, the AAR can include an AVP indicating to the terminating PCRF that the call requires NRSPCA on Offer such that the PCRF delays sending an AAA message back to the AS until the PCRF receives an indication of a successful secondary PDP context activation from the terminating access network (e.g., GGSN). An advantage of this is that the terminating AS helps reduce IMS message exchanges and helps initiate the HPA page to the terminating satellite UE.

Yet another embodiment relates to a terminating PCRF and method implemented by the same for establishing a call between an originating UE and a terminating satellite UE. The terminating PCRF comprises at least a processor and a memory that stores processor-executable instructions where the processor interfaces with the memory and executes the processor-executable instructions to enable at least the following steps 1, 2, 3, 4, 5, 6, 7, and 8. At step 1, the terminating PCRF receives from the terminating AS an AAR to initiate a NRSPCA on Offer to establish a secondary PDP context between the terminating access network and the terminating satellite UE via the terminating radio access network. At step 2, the terminating PCRF determines if the AAR indicates the NRSPCA on Offer. If the result of the determine step 2 is that the AAR does indicate the NRSPCA on Offer, then the terminating PCRF performs the following steps: (a) generate charging rules per media component (step 3); (b) obtain QoS information per media component (step 4); (c) initiate the NRSPCA on Offer by sending a RAR message to the terminating access network (e.g., GGSN) (step 5); (d) wait to receive a RAA message from the terminating access network (e.g., GGSN) which confirms establishment of the secondary PDP context between the terminating access network and the terminating satellite UE via the terminating radio access network (step 6); (e) upon receipt of the RAA message from the terminating access network (e.g., GGSN), send an AAA message back to the terminating AS (step 7). If the result of the determine step 2 is that the AAR does not indicate the NRSPCA on Offer, then the terminating PCRF sets up a NRSPCA on Answer (step 8). An advantage of this is that the terminating PCRF helps reduce IMS message exchanges.

In yet another embodiment relates to a terminating satellite RAN and method implemented by the same for establishing a call between an originating UE and a terminating satellite UE. The terminating satellite RAN comprises at least a processor and a memory that stores processor-executable instructions where the processor interfaces with the memory and executes the processor-executable instructions to enable at least the following steps 1, 2, 3, and 4. At step 1, the terminating satellite RAN receives from the terminating access network (e.g., SGSN) a HPA message which is to be transmitted to the terminating satellite UE. At step 2, the terminating satellite RAN determines if the HPA message indicates that the call is a conversational call or interactive call. If the result of the determine step 2 is that the HPA message indicates that the call is a conversational call or interactive call, then the terminating satellite RAN at step 3 sends a HPA page to the terminating satellite UE. If the result of the determine step 2 is that the HPA message indicates that the call is not a conversational call or interactive call, then the terminating satellite RAN at step 4 sends a non-HPA page to the terminating satellite UE. An advantage of this is that the terminating satellite RAN selectively employs HPA pages for conversational/interactive calls.

Additional embodiments of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 3A is a functional block diagram of a satellite RAN integrated with an IMS network which is used to help explain the different embodiments of the present invention;

FIGS. 6A-1, 6A-2, 6A-3, 6A-4, 6B-1, 6B-2, 6B-3, 6B-4, 6C-1, 6C-2, 6C-3, 6C-4, 6D-1, 6D-2, 6D-3, 6D-4, 6E-1, 6E-2, 6E-3, 6E-4, 6F-1, 6F-2, 6G-1, 6G-2, 6H-1, 6H-2, 6H-3, 6H-4, 6I-1, and 6I-2 illustrate a detailed end-to-end call signal flow diagram that illustrates the NRSPCA on Offer procedure together with HPA paging for conversational services when the terminating satellite UE is inside a building in accordance with different embodiments of the present invention;

DETAILED DESCRIPTION

Figure 1:
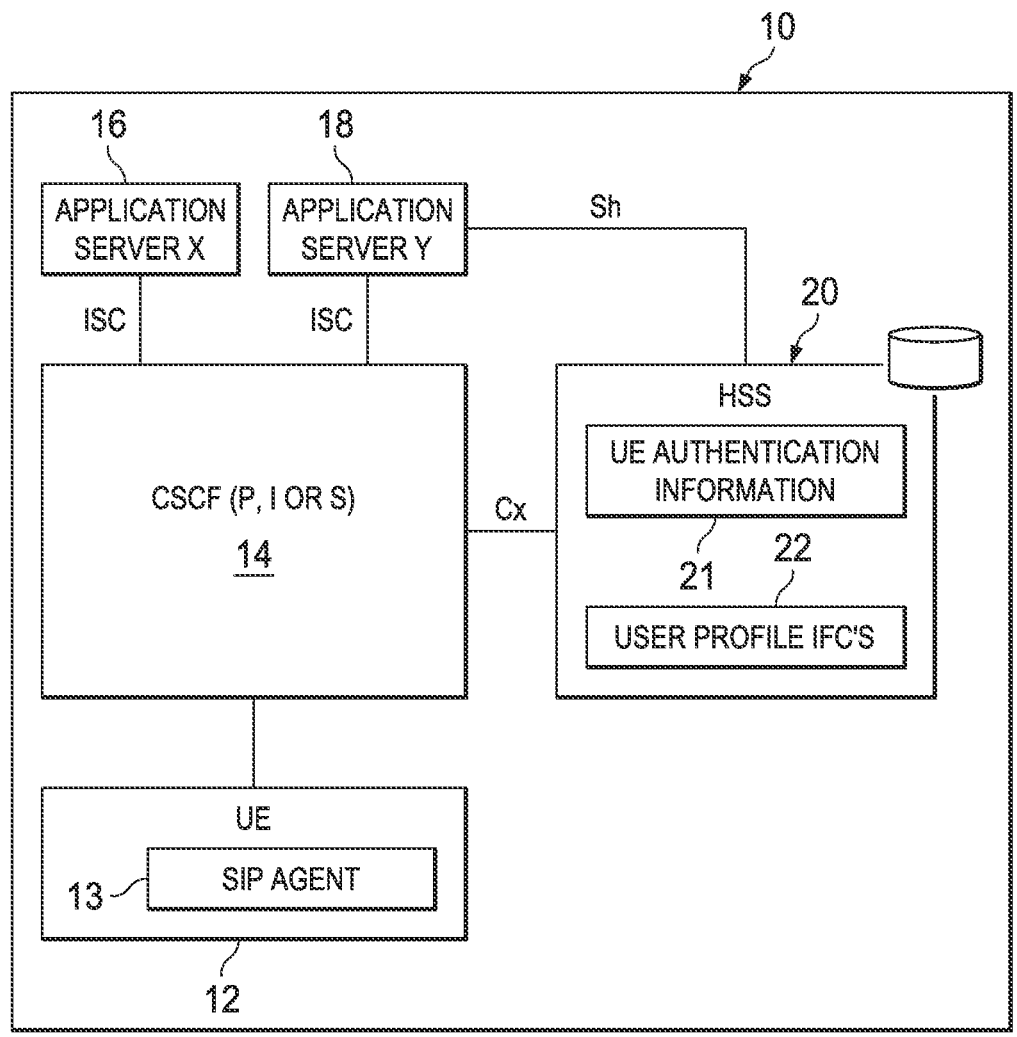
FIG. 1 (PRIOR ART) is a functional block diagram of a conventional IMS network.
Figure 2:
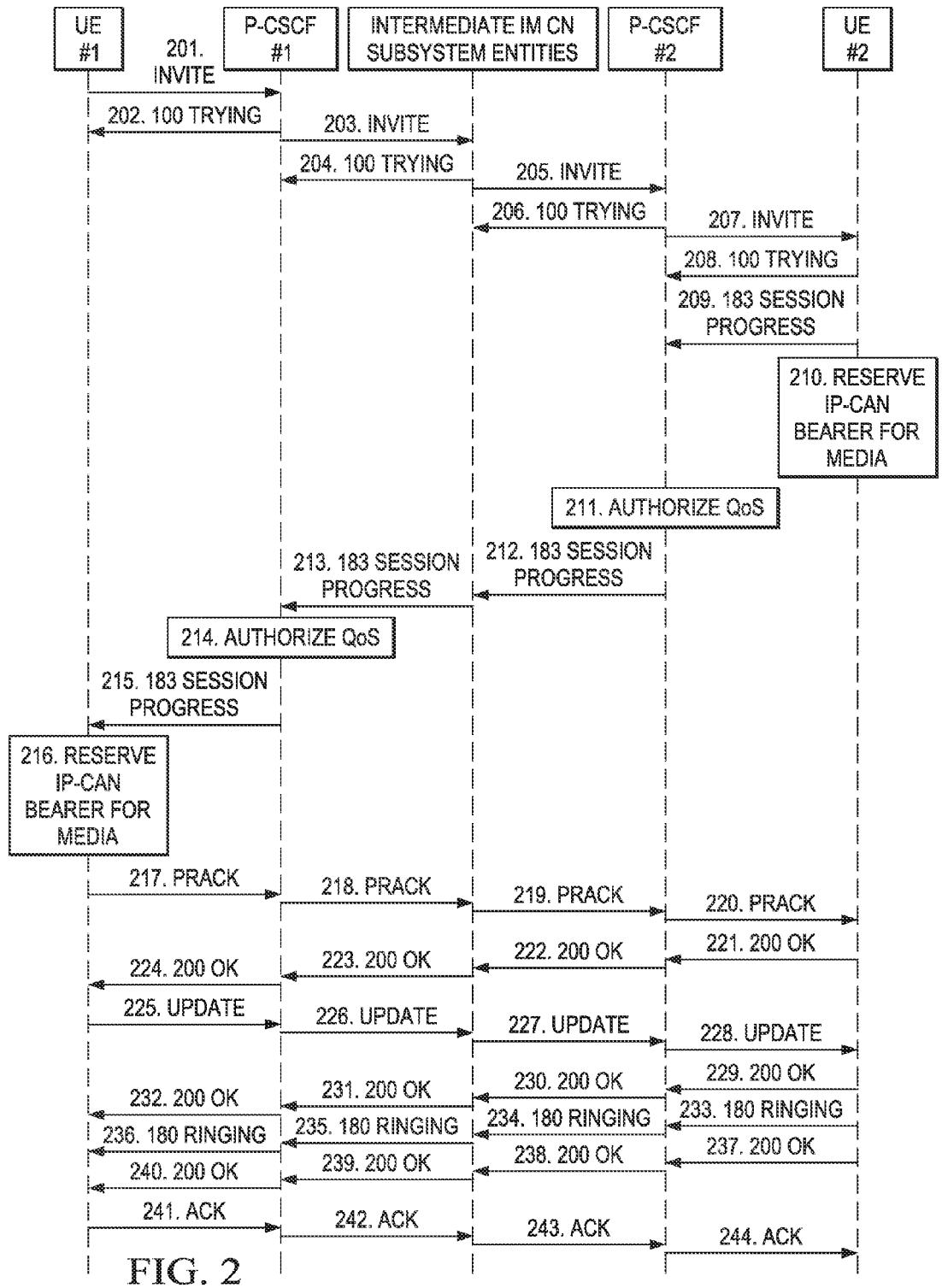
FIG. 2 (PRIOR ART) is a call flow diagram of conventional call setup in an IMS network.

FIG. 3A depicts an integrated satellite/IMS network 22 which has an AS 16, an PCRF 42 and a HSS 50 which have been enhanced in accordance with different embodiments of the present invention. In this example, the integrated satellite/IMS network 22 connects satellite mobile terminals 24a and 24b (which have built-in IMS clients-SIP agents 13) with each other by using the application server 26 and other resources in an IMS network 41. Alternatively, the integrated satellite/IMS network 22 can also connect satellite mobile terminal 24b (for example) with communication terminals (not satellite mobile terminal 24a) located in other networks, such as the Public Switched Telephone Network (PSTN) 30. In the present example, traffic to and from the satellite mobile terminals 24a and 24b is transmitted by one or more satellites 32, with access controlled by a satellite Radio Access Network (RAN) 34. The satellite RAN 34 is communicatively coupled to a terrestrial wireless IP Connectivity Access Network (IP-CAN) 36. In the example depicted in FIG. 3A, the wireless IP-CAN 36 is a Wideband Code Division Multiple Access (WCDMA) network with General Packet Radio Service (GPRS) comprising at least a Gateway GPRS Service Node (GGSN) 38 and a Serving GPRS Support Node (SGSN) 40. The WCDMA IP-CAN 36 is connected to the IMS network 41 comprising a Policy and Charging Rule Function (PCRF) 42, a P-CSCF 44, a S-CSCF 46, and an application server 26 (which includes HPA/NRSPCA logic 27).

The IMS network 41 additionally comprises a Home Location Register (HLR) 48 and a HSS 50 (which stores information about HPA subscriptions 51), a Media Resource Function 52 comprising a Media Resource Function Controller (MRFC) and a Media Resource Function Processor (MRFP), and a server 54 performing address lookup and translation functions such as DNS, Electronic Numbering (ENUM), and Dynamic Host Configuration Protocol (DHCP). The IMS network 41 further includes a Media Gateway Controller Function (MGCF) and Signaling Gateway (SGW) 56 connected to a Media Gateway (MGW) 58 across a H.248 interface. The structure and operation of the IMS network 41 is well defined and understood by those skilled in the art, and is not further explained herein. Those of skill in the art will further recognize the existence of a packet core, comprising switches and routers (not shown), that carries bearer traffic between the GGSN 38 and MGW 58.

FIG. 3A also depicts a voice or interactive call directed to satellite mobile UE 24b which is now located in a building 60. A High Penetration Alert (HPA) page 61 is selectively employed to reach the called UE 24. The HPA displays a message, such as that depicted, that the user has an incoming call, and requesting the user to exit the building 60 to receive the call from the satellite 32. According to embodiments described herein, the HPA page 61 is selectively employed based on the type of call, the state of the called UE 24b, and whether the called user subscribes to a HPA service.

The operation of various embodiments of the present invention are described herein in the context of a voice call from one satellite UE 24a (identified as user "A" or "UE A") to another satellite UE 24b (identified as user "B" or "UE B)), when UE B is in the building 60. Both the originating mobile satellite UE 24a and the terminating mobile satellite UE 24b typically include a special codec to optimize the transmission of voice packet over the satellite link. In this case, the standard IMS call flow can be enhanced to (for example): (1) give the originating mobile satellite UE 24 full control in providing Quality of Service (QoS) for various end user services; (2) increase successful call establishment rate without wasting satellite radio resources by using HPA paging only for selected bearer services (e.g., only voice and interactive calls); and (3) charge mobile satellite subscribers for subscribing to HPA as a service.

Figure 3B:
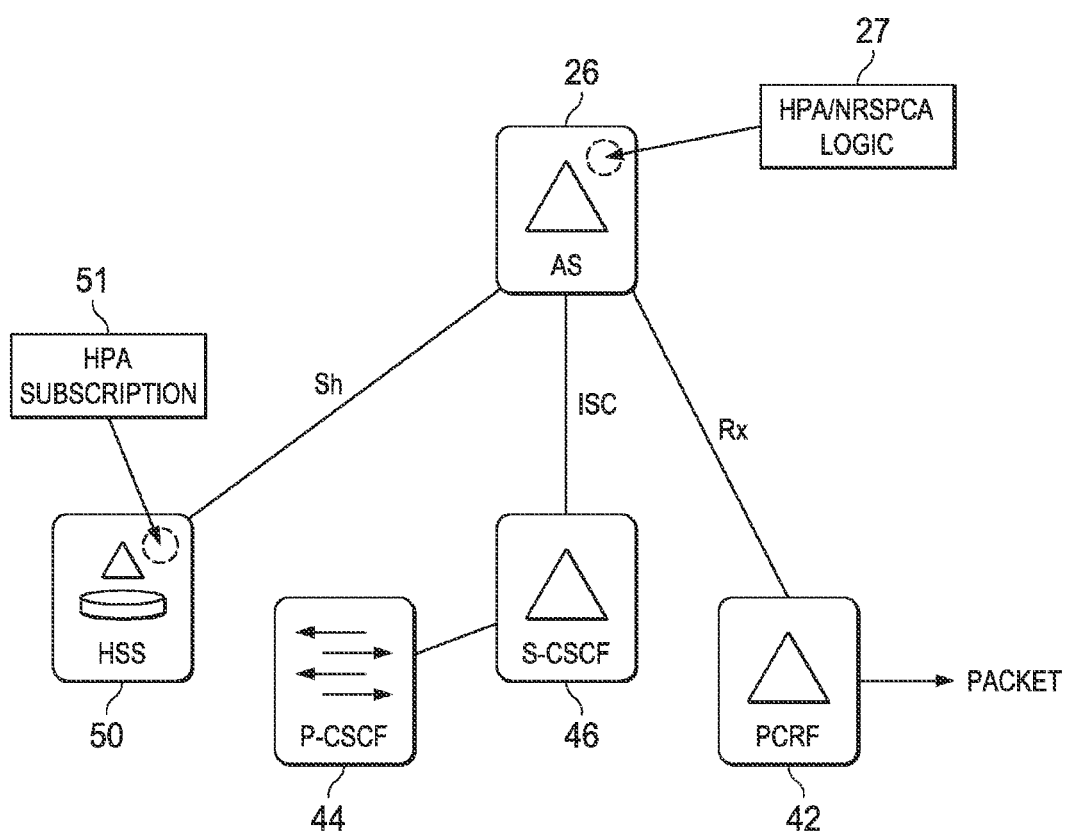
FIG. 3B depicts a portion of the integrated satellite/IMS network shown in FIG. 3A which is referred to herein as the HPA IMS node level architecture and is used along with several different signal flow diagrams to help explain the different embodiments of the present invention.

FIG. 3B depicts a portion of the integrated satellite/IMS network 22 which is referred to herein as the HPA IMS node level architecture and is used along with several different signal flow diagrams to help explain the different embodiments of the present invention. The HPA IMS node level architecture includes the AS 26 (which includes HPA/NRSPCA Logic 27) that is operatively connected via the Sh interface to the HSS 50 (which stores HPA subscriptions 51). In addition, the AS 26 is operatively connected via the ISC interface to S-CSCF 46 (which is connected to P-CSCF 44). Furthermore, the AS 26 is operatively connected via Rx interface to the PCRF 42. In the present invention and as will be discussed in detail below, an originating call (e.g., from UE A 24a) and a terminating call (e.g., to UE B 24b) are triggered to be processed by an AS 26 (note: as discussed below one AS 26 may be used to process an originating call from the originating UE 24a and another AS 26 may be used to process a terminating call to the terminating UE 24b). The AS 26 processes the originating call using the HPA/NRSPCA logic 27 and sets up the Network Initiated Secondary PDP Context (NRSPCA) on Offer through the PCRF 42 to establish a secondary PDP context between the WCDMA access network 36 and the originating UE A 24a. Furthermore, the AS 26 processes the terminating call using the HPA/NRSPCA logic 27 and sets up the Network Initiated Secondary PDP Context (NRSPCA) on Offer through the PCRF 42 to establish a secondary PDP context between the WCDMA access network 36 and the terminating UE B 24b. The AS 26 also fetches the subscriber information for the terminating UE B 24b to determine if they have a HPA subscription 51. If the terminating UE B 24b has a HPA subscription 51, then the AS 26 triggers a HPA page 61 towards the WCDMA access network 36 and Satellite RAN 34. The AS 26 also charges UE B 24b for subscribing and using HPA as a service.

The service logic in the IMS nodes AS 26, PCRF 42, and the satellite RAN 34 required to support the features described above namely the NRSPCA on Offer and the HPA are described in detail below, for both the originating and terminating sides. For the purpose of explanation, both the originating mobile UE 24a (UE A) and terminating mobile UE 24b (UE B) are considered as mobile satellite subscribers as the most general case. However, in general, either of them could be a PSTN or PLMN subscriber and the logic for the other subscriber would remain unchanged.

Example #1

Service Logic

Originating Side Service Logic

Figure 4A:
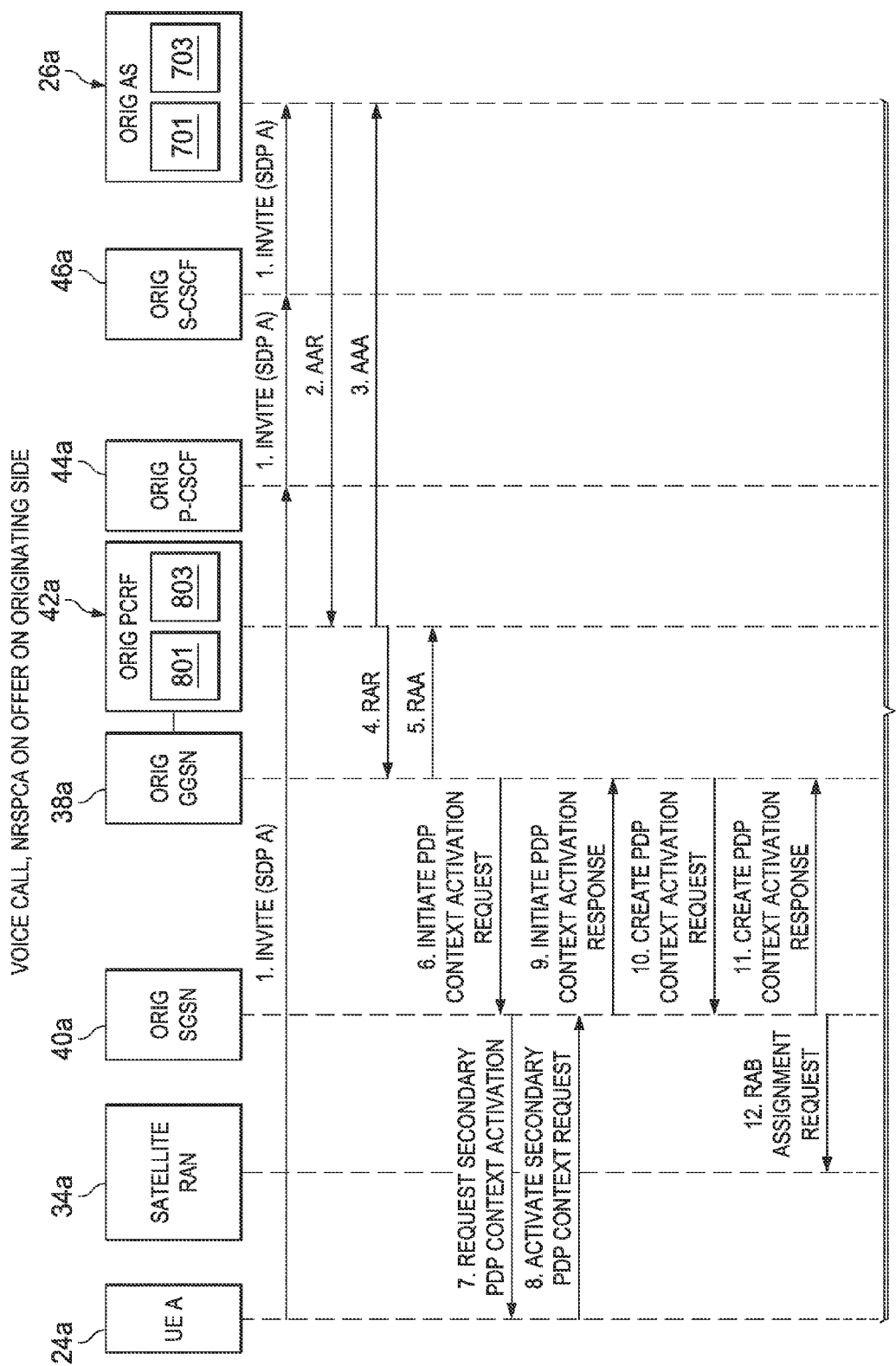
FIGS. 4A-4B illustrate a signal flow diagram used to explain the signaling for a voice call NRSPCA on Offer call flow on the originating side in accordance with an embodiment of the present invention.
Figure 4B:
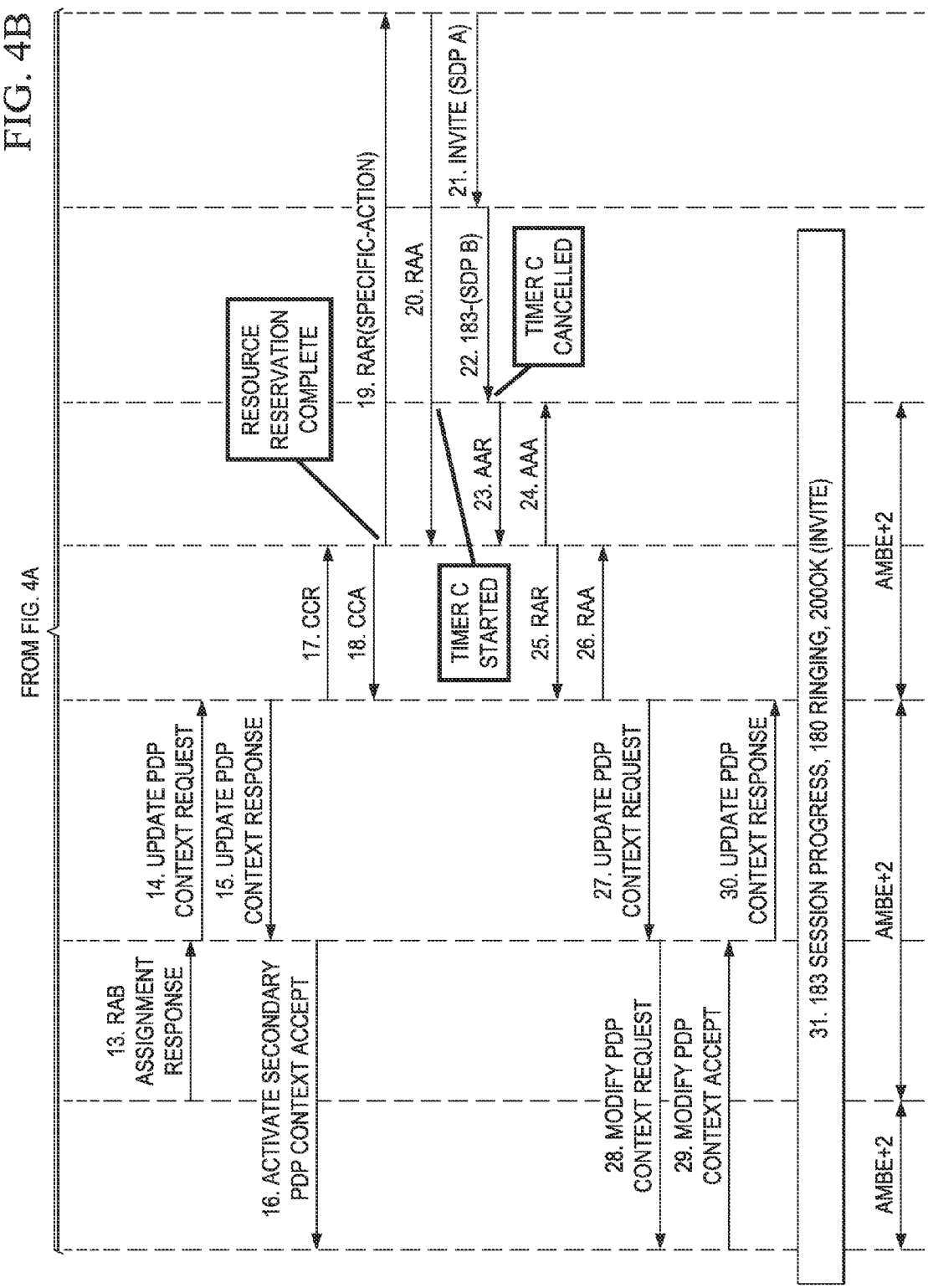

FIGS. 4A-4B illustrate a signal flow diagram used to explain the signaling for a voice call NRSPCA on Offer call flow on the originating side in accordance with an embodiment of the present invention. In this signal flow diagram, the components shown are as follows: the originating satellite mobile UE 24a (UE A), the satellite RAN 34a, the originating SGSN 40a, the originating GGSN 38a, the originating PCRF 42a, the originating P-CSCF 44a, the originating S-CSCF 46a, and the originating AS 26a. A step-by-step discussion is provided as follows:

1. The originating S-CSCF 46a receives a call (SIP INVITE message—with SDP A—associated with UE A 26a) from the originating satellite mobile UE 24a via the satellite RAN 34a, the originating GGSN 38a, and the originating P-CSCF 44a. The originating S-CSCF 46a routes the SIP INVITE message to the originating AS 26a.

2. The originating AS 26a sends a Diameter AAR message containing UE A's SDP to the originating PCRF 42a to trigger the NRSPCA on Offer procedure. The AAR message has key AVPs which are set as follows:

The Specific-Action AVP is set to INDICATION_OF_SUCCESSFUL_RESOURCES_ALLOCATION to indicate subscription to the Resource Reservation Completion event.

The SERVICE_INFO_STATUS AVP is set to PRELIMINARY_SERVICE_INFORMATION.

3. The originating PCRF 42a sends AAA back to the originating AS 26a.

4. The originating PCRF 42a sends a RAR message to the originating GGSN 38a. The originating PCRF 42a indicates the subscription to the Resource Reservation Completion event to the originating GGSN 38a as follows:

The Event-Trigger AVP is set to SUCCESSFUL_RESOURCE_ALLOCATION.

The Resource-Allocation-Notification AVP of the Charging-Rule-Install AVP is set to Enable-Notification.

5. The originating GGSN 38a sends RAA back to originating PCRF 42a to acknowledge the receipt of the RAR.

6. The originating GGSN 38a sends Initiate PDP Context Activation Request message to the originating SGSN 40a.

7. The originating SGSN 40a maps the ARP received in the Initiate PDP Context Activation Request message to the Precedence Class and sends Request Secondary PDP Context Activation to UE A 24a to establish a dedicated secondary PDP Context for voice call.

8. UE A 24a sends Activate Secondary PDP Context Request to the originating SGSN 40a.

9. The originating SGSN 40a sends Initiate PDP Context Activation Response to the originating GGSN 38a.

10. The originating GGSN 38a sends Create PDP Context Activation Request to the originating SGSN 40a.

11. The originating SGSN 40a sends Create PDP Context Activation Response to the originating GGSN 38a.

12. The originating SGSN 40a sends RAB Assignment Request to the RAN 34a.

13. The RAN 34a sends RAB Assignment Response to the originating SGSN 40a.

14. The originating SGSN 40a sends Update PDP Context Request to the originating GGSN 38a.

15. The originating GGSN 38a sends Update PDP Context Response to the originating SGSN 40a.

16. The originating SGSN 40a sends Activate Secondary PDP Context Accept to UE A 24a.

17. The originating GGSN 38a sends a CCR (Update) to notify the originating PCRF 42a of the Resource Reservation Completion event. The Charging-Rule-Report AVP includes the PCC-Rule-Status AVP set to ACTIVE. The Charging-Rule-Name AVP refers to the applicable PCC rules for which the secondary PDP was activated.

18. The originating PCRF 42a sends CCA to the originating GGSN 38a to acknowledge the CCR.

19. The originating PCRF 42a sends RAR to notify the originating AS 26a of the Resource Reservation Completion event. The Specific-Action AVP is set to INDICATION_OF_SUCCESSFUL_RESOURCES_ALLOCATION together with Flow AVPs referring to the applicable media flows for which the secondary PDP was activated.

20. The originating AS 26a sends RAA back to the originating PCRF 42a to acknowledge the RAR.

21. The originating AS 26a sends SIP INVITE (with SDP A—associated with UE A 26a) to originating S-CSCF 46a (which will be sent to UE B 24b). Thereafter, UE B 24b (not shown) sends 183 Session Progress (SDP B) to the originating S-CSCF 46a which sends it to originating AS 26a. Then, the originating AS 26a sends AAR to the originating PCRF 42a to update media authorization session. The originating PCRF 42a then sends AAA to the originating AS 26a to acknowledge the AAR. The AS 26a then sends SIP INVITE (SDP B—associated with UE B 26b) to originating S-CSCF 46a.

22. The originating S-CSCF 46a sends SIP INVITE (with SDP B—associated with UE B 26b) to originating P-CSCF 44a.

23. The originating P-CSCF 44a sends AAR to originating PCRF 42a.

Figures 1, 6A:
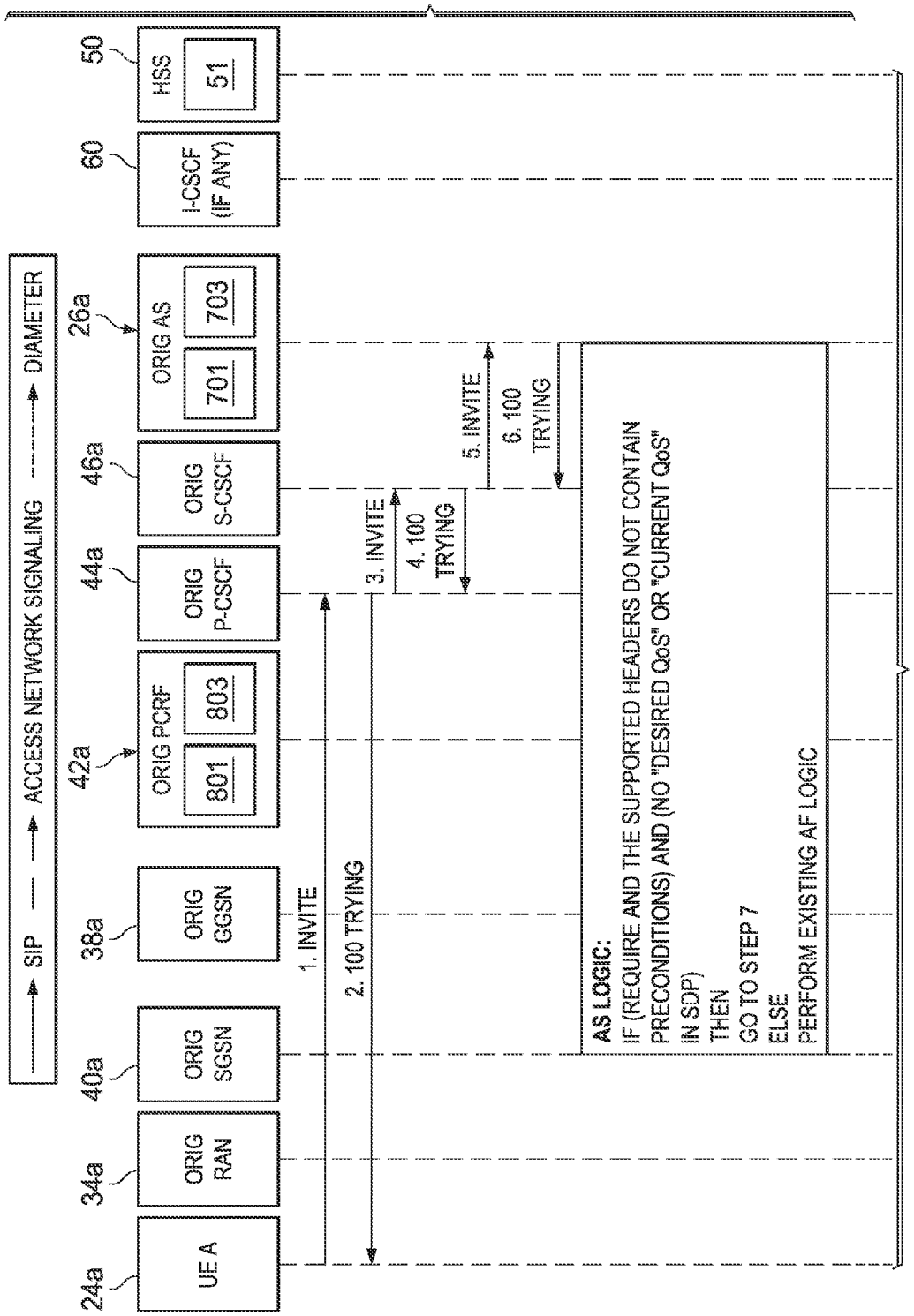
Figures 1, 6F:
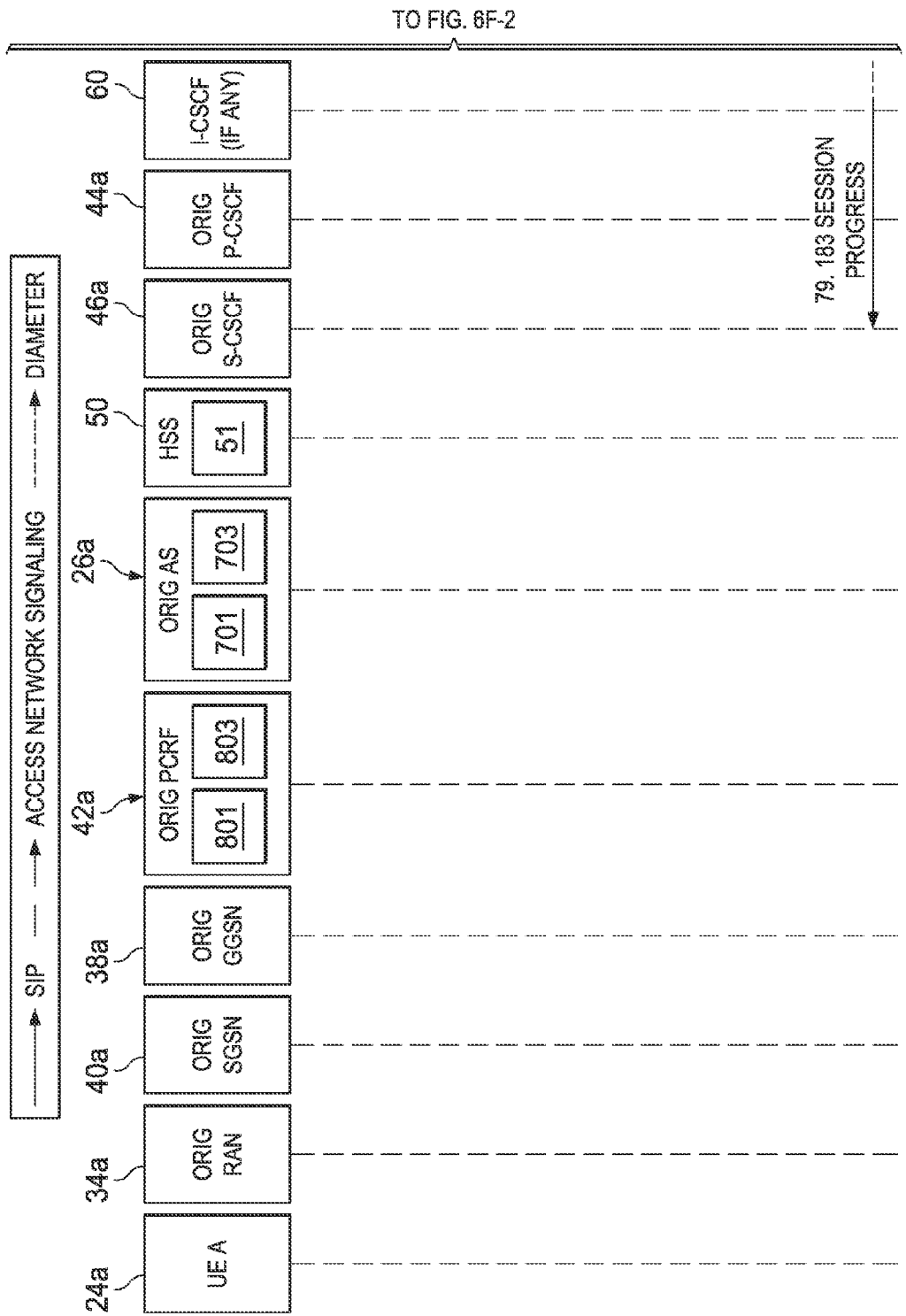
Figures 2, 6F:
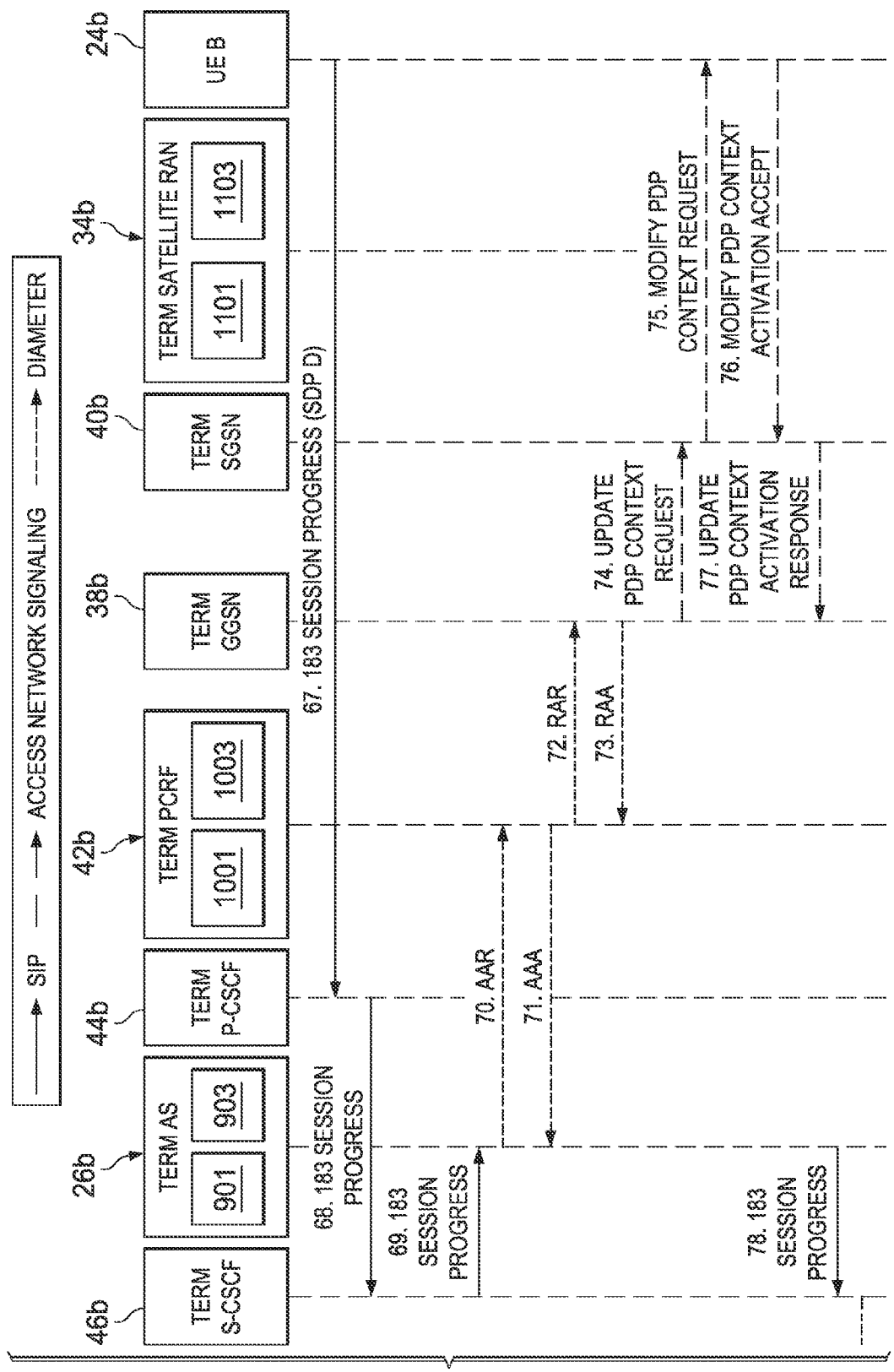
Figures 1, 6G:
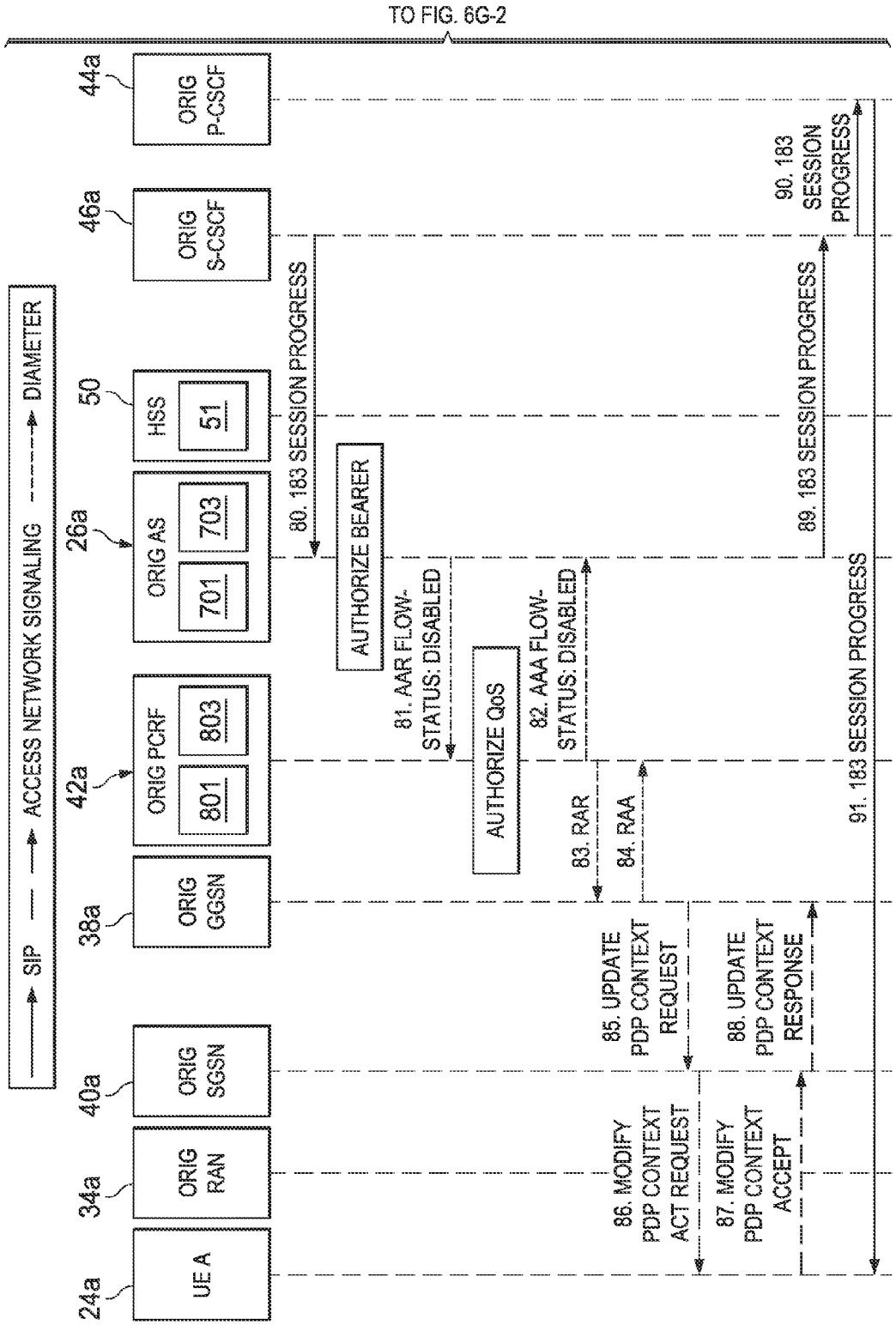
Figures 2, 6G:
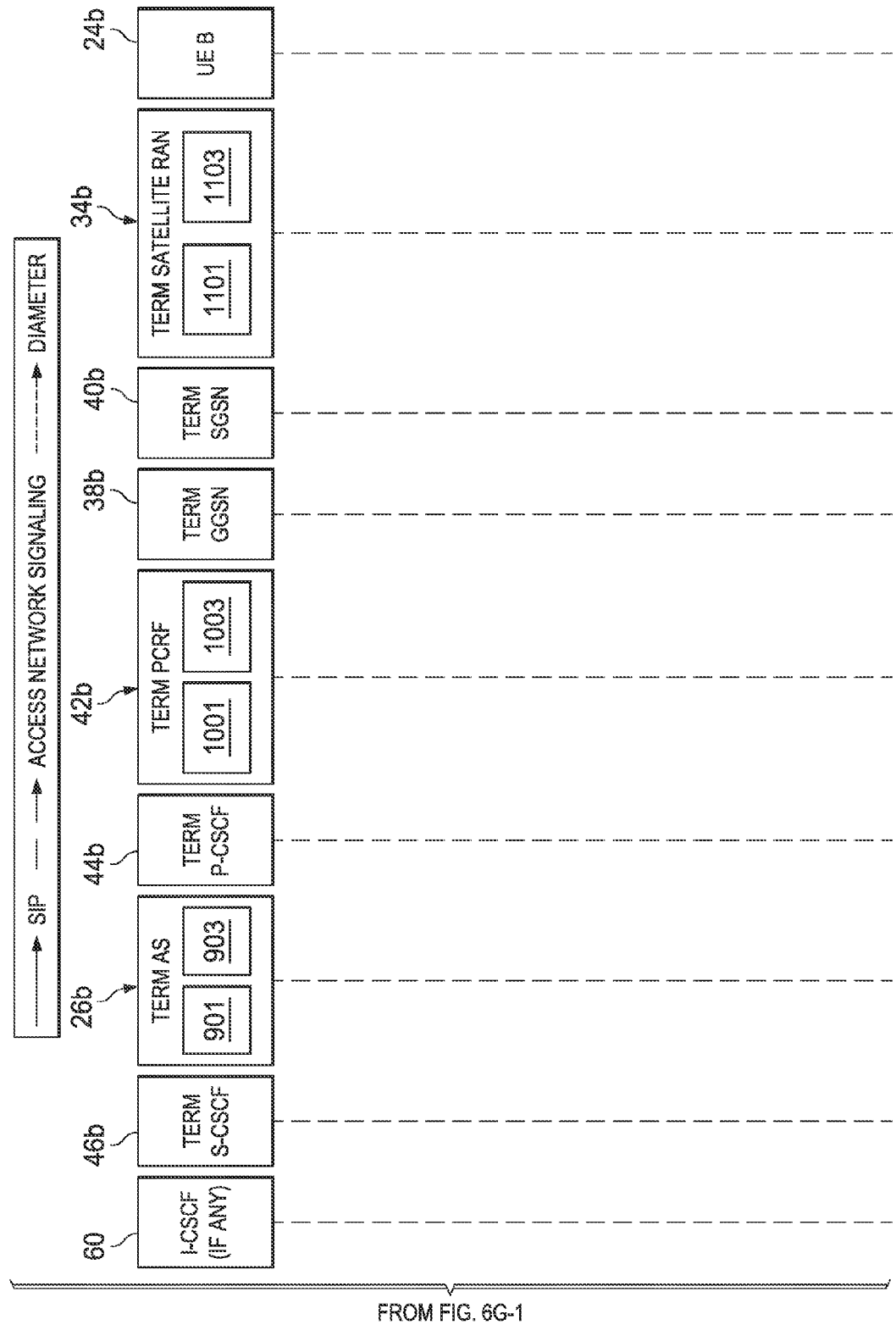
Figures 1, 6I:
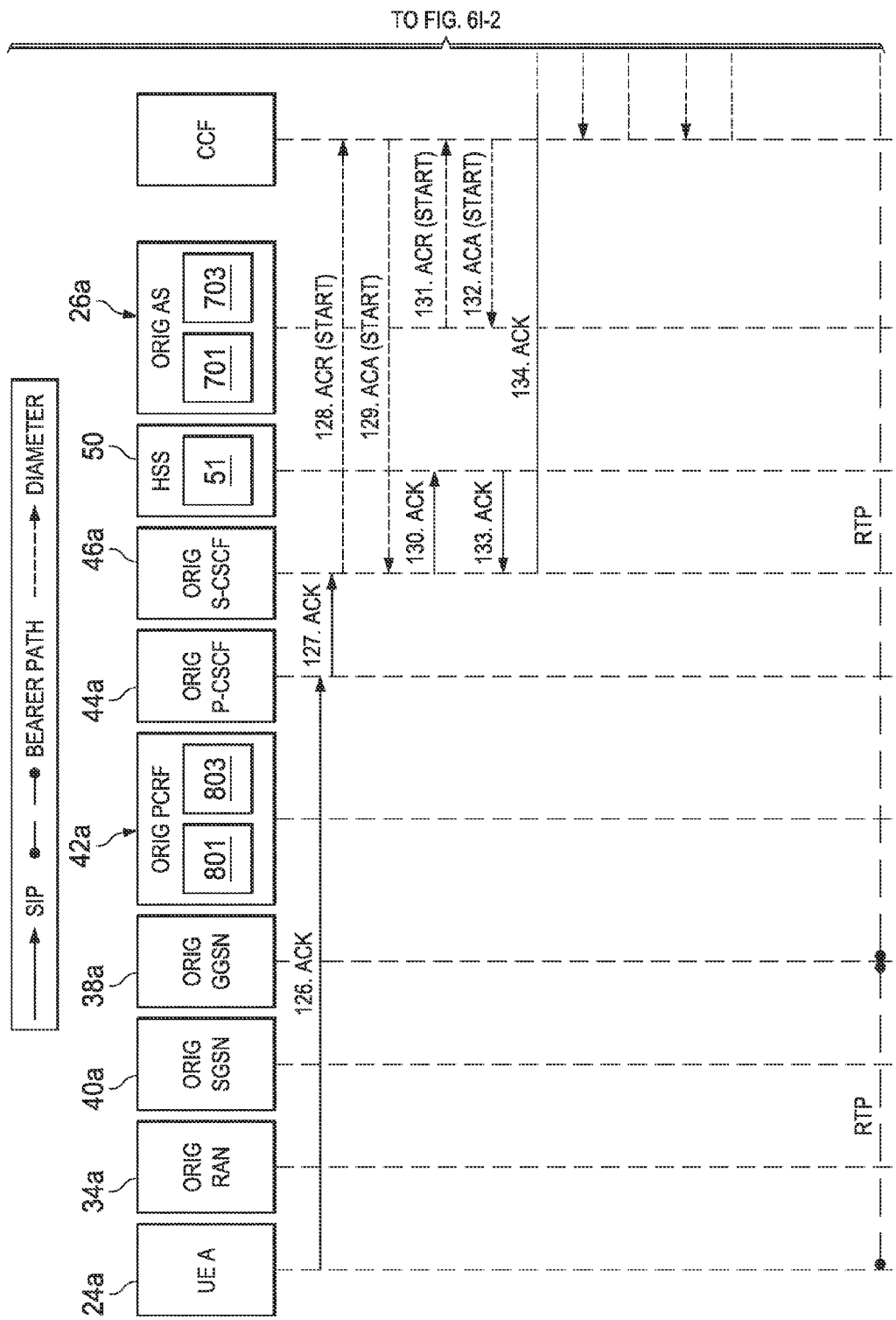
Figures 2, 6I:
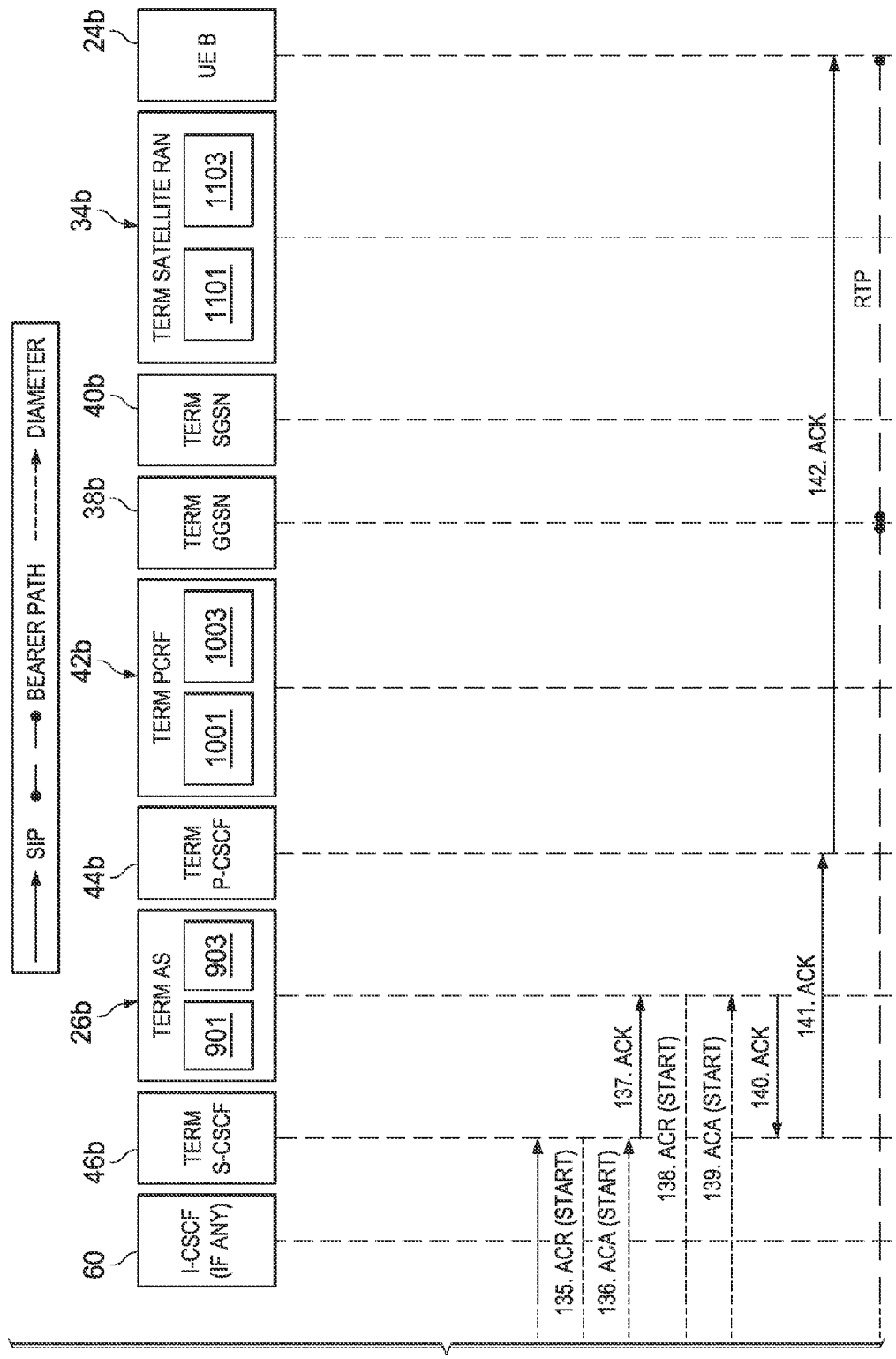

24. The originating PCRF 42a sends AAA to originating P-CSCF 44a (Note: steps 22-24 may not necessarily be the preferred signaling process for an alternative signaling process reference is made to FIG. 6G-1's steps 80-82 (discussed below).

25. The originating PCRF 42a sends RAR to originating GGSN 38a.

26. The originating GGSN 38a sends RAA to originating PCRF 42a.

27-30. The originating GGSN 38a interacts with the originating SGSN 40a and the UE A 24a to modify the secondary PDP context.

31. 183 Session Progress, 180 Ringing, 200OK (Invite) messaging.

Terminating Side Service Logic

Figure 5A:
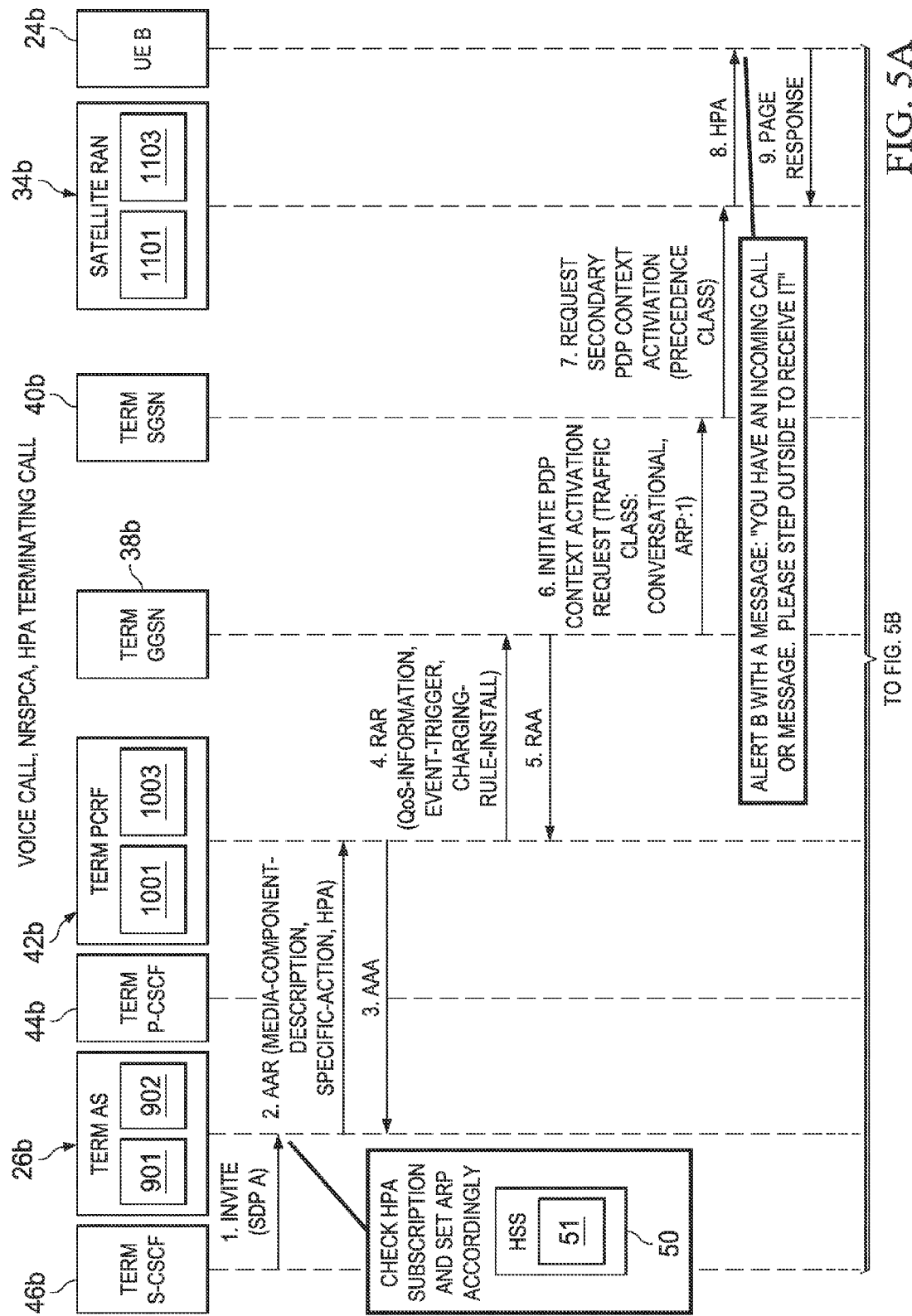
FIGS. 5A-5B illustrate a signal flow diagram used to explain the signaling for a voice call NRSPCA on Offer call flow on the terminating side in accordance with an embodiment of the present invention.
Figure 5B:
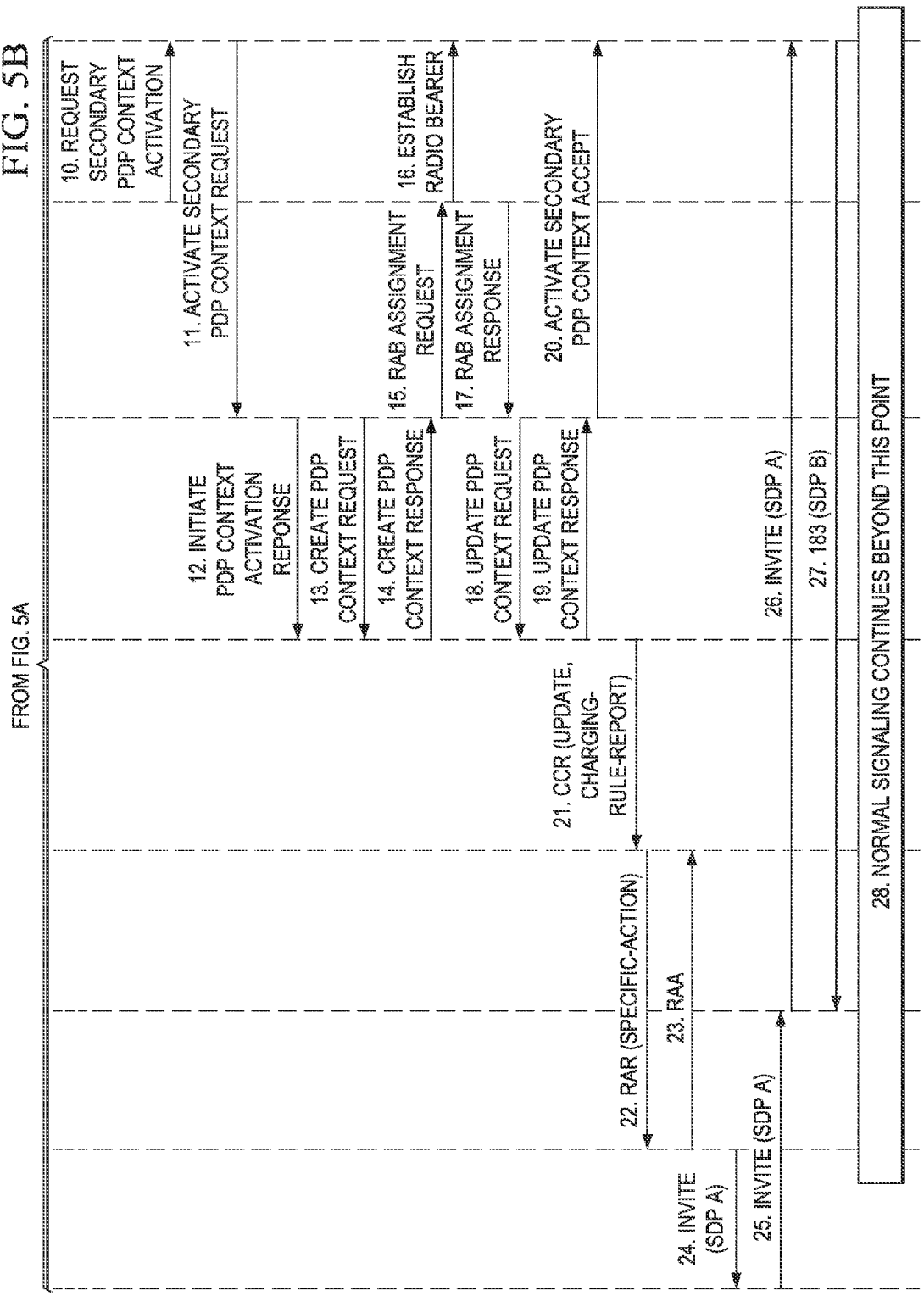

FIGS. 5A-5B illustrate a signal flow diagram used to explain the signaling for a voice call NRSPCA on Offer call flow on the terminating side in accordance with an embodiment of the present invention. In this signal flow diagram, the components shown are as follows: the terminating satellite mobile UE 24b (UE B), the satellite RAN 34b, the terminating SGSN 40b, the terminating GGSN 38b, the terminating PCRF 42b, the terminating P-CSCF 44b, the terminating S-CSCF 46b, and the terminating AS 26b. It should be appreciated that the originating components 26a, 34a, 38a, 40a, 42a, 44a, 46a etc. . . . are the same as the terminating components 26b, 34b, 38b, 40b, 42b, 44b, 46b etc. . . . when both UE A 24a and UE B 24b are registered with the same integrated satellite/IMS network 22. If UE A 24a and UE B 24b are registered with different networks then the originating components 26a, 34a, 38a, 40a, 42a, 44a, 46a etc. . . . associated with the UE A's network would not be the same as the terminating components 26b, 34b, 38b, 40b, 42b, 44b, 46b etc. associated with the UE B's network. A step-by-step discussion is provided as follows:

1. The terminating S-CSCF 46b receives a call from the originating network. The terminating S-CSCF 46b routes the SIP INVITE message (SDP-A associated with UE A 26a) to the terminating AS 26b.

2. The terminating AS 26b sends a Diameter AAR message containing UE A's SDP to the terminating PCRF 42b to trigger the NRSPCA procedure. The Specific-Action AVP is set to INDICATION_OF_SUCCESSFUL_RE-SOURCES_ALLOCATION to indicate subscription to the Resource Reservation Completion event. In this example, it is assumed that the terminating AS 26b has confirmed that UE B 26b has an HPA subscription 51 before sending the AAR message to the terminating PCRF 42b (see FIG. 9).

3. The terminating PCRF 42b sends RAA back to the terminating AS 26b.

4. The terminating PCRF 42b sends the RAR message to the terminating GGSN 38b. The terminating PCRF 42b indicates the subscription to the Resource Reservation Completion event for the terminating GGSN 38b as follows:

The Event-Trigger AVP is set to SUCCESSFUL_RE-SOURCE_ALLOCATION.

The Resource-Allocation-Notification AVP of the Charging-Rule-Install AVP is set to Enable-Notification.

5. The terminating GGSN 38b sends RAA to acknowledge the receipt of the RAR to the terminating PCRF 42b.

6. The terminating GGSN 38b sends Initiate PDP Context Activation Request message to the terminating SGSN 40b.

7. The terminating SGSN 40b sends Request Secondary PDP Context Activation (Precedence Class) message to the terminating satellite RAN 34b.

8. The satellite RAN 34b sends an HPA message 61 to UE B 26b. UE B 26b displays a message alerting user B of UE B 24b of an incoming call. The user B steps outside to receive the call.

9. UE B 26b sends a Page Response to the satellite RAN 34b.

10. The satellite RAN 34b sends Request Secondary PDP Context Activation message to UE B 26b.

11. UE B 26b sends Activate Secondary PDP Context Request to the terminating SGSN 40b.

12. The terminating SGSN 40b sends Initiate PDP Context Activation Response to the terminating GGSN 38b.

13. The terminating SGSN 40b sends Create PDP Context Request to the terminating GGSN 38b.

14. The terminating GGSN 38b sends Create PDP Context Response to the terminating SGSN 40b.

15. The terminating SGSN 40b sends RAB Assignment Request to the satellite RAN 34b.

16. The satellite RAN 34b allocates radio traffic channels with media diversity.

17. The satellite RAN 34b sends RAB Assignment Response to the terminating SGSN 40b.

18. The terminating SGSN 40b sends Update PDP Context Request to the terminating GGSN 38b.

19. The terminating GGSN 38b sends Update PDP Context Response to the terminating SGSN 40b.

20. The terminating SGSN 40b sends Activate Secondary PDP Context Accept to UE B 26b.

21. The terminating GGSN 38b sends a CCR (Update) to notify the terminating PCRF 42b of the Resource Reservation Completion event. The Charging-Rule-Report AVP includes the PCC-Rule-Status AVP set to ACTIVE. The Charging-Rule-Name AVP refers to the applicable PCC rules for which the secondary PDP was activated.

22. The terminating PCRF 42b sends RAR to notify the terminating AS 26b of the Resource Reservation Completion event. The Specific-Action AVP is set to INDICATION_OF-_SUCCESSFUL_RESOURCES_ALLOCATION together with Flow AVPs referring to the applicable media flows for which the secondary PDP was activated.

23. The terminating AS 26b sends RAA back to the terminating PCRF 42b to acknowledge the RAR.

24. The terminating AS 26b sends SIP INVITE (SDP A—associated with UE A 24a) to terminating S-CSCF 46b.

25. The terminating S-CSCF 46b sends SIP INVITE (SDP A—associated with UE A 24a) to terminating P-CSCF 44b.

26. The terminating P-CSCF 44b sends SIP INVITE (SDP A—associated with UE A 24a) to UE B 26b.

27. The UE B 26b sends 183 (SDP B—associated with UE B 24b) message to terminating P-CSCF 44b.

28. Normal signaling continues beyond this point to establish call between UE A 26a and UE B 26b.

From the foregoing, it should be appreciated based on FIGS. 4-5's signal flow diagrams that the present invention has many advantages some of which are as follows:

The present invention optimizes the messaging flow to set up a SIP session (e.g. voice call, video call, Messaging) from or to a mobile satellite terminal using IP Multimedia Subsystem over WCDMA access networks.

The present invention gives the operator full control in providing QoS for various end user services.

The present invention uses High Penetration Alert (HPA) paging only for selected bearer services (e.g. voice calls only).

The present invention charges mobile satellite subscribers for subscribing to HPA as a service.

The present invention optimizes satellite radio resources usage and increases the successful call establishment rate by using Network Request Secondary PDP Context Activation on Offer and HPA to set up mobile satellite UE to mobile satellite UE or PSTN/PLMN device to mobile satellite call.

The present invention reduces the number of SIP messages required to set up a mobile satellite terminal to mobile satellite terminal call over IMS.

It should also be appreciated that the present invention has distinct differences when compared to the co-assigned U.S. Publication No. 2011/0075655 A1. Some of these differences are as follows:

The present invention uses the AS 26, HSS 50 and/or PCRF 42 to implement the present invention. In contrast, the co-assigned U.S. Publication No. 2011/0075655 A1 uses the P-CSCF and PCRF to implement their invention.

In the present invention, the HPA subscription 51 is stored in the HSS 50. In the co-assigned U.S. Publication No. 2011/0075655 A1 the HPA subscription was stored in the PCRF. The HSS 50 is a more a more logical node (IMS standard) to store the HPA subscription 51.

In the present invention, the AS 26 uses a standard interface Sh to retrieve the HPA subscription 51 from the HSS 50.

In the present invention, the AS 26 generates the charging record (CDR) for the HPA subscription 51 and usage and sends the CDR to the billing system (e.g., the CDR is shown being generated before step 112 in FIG. 6H-4). This is not possible in the co-assigned U.S. Publication No. 2011/0075655 A1 since the P-CSCF cannot generate a charging record.

Example #2

Service Logic

FIGS. 6A-1, 6A-2, 6A-3, 6A-4, 6B-1, 6B-2, 6B-3, 6B-4, 6C-1, 6C-2, 6C-3, 6C-4, 6D-1, 6D-2, 6D-3, 6D-4, 6E-1, 6E-2, 6E-3, 6E-4, 6F-1, 6F-2, 6G-1, 6G-2, 6H-1, 6H-2, 6H-3, 6H-4, 6I-1, and 6I-2 illustrate a detailed end-to-end call signal flow diagram that illustrates the NRSPCA on Offer procedure together with HPA paging for conversational services when the terminating satellite UE 24b is inside a building 61 in accordance with an embodiment of the present invention. In this signal flow diagram, the following components are shown the originating satellite mobile UE A 24a, the originating RAN 34a, the originating SGSN 40a, the originating GGSN 38a, the originating PCRF 42a, the originating P-CSCF 44a, the originating S-CSCF 46a, the originating AS 26a, the HSS 50, the I-CSCF 60, the terminating satellite mobile UE B 24b (UE B), the terminating satellite RAN 34b, the terminating SGSN 40b, the terminating GGSN 38b, the terminating PCRF 42b, the terminating P-CSCF 44b, the terminating S-CSCF 46b, and the terminating AS 26b. It should be appreciated that the originating components 26a, 38a, 40a, 42a, 44a, 46a etc. . . . are the same as the terminating components 26b, 38b, 40b, 42b, 44b, 46b etc. . . . when both UE A 24a and UE B 24b are registered with the same integrated satellite/IMS network 22. If UE A 24a and UE B 24b are registered with different networks then the originating components 26a, 38a, 40a, 42a, 44a, 46a etc. . . . associated with the UE A's network would not be the same as the terminating components 26b, 38b, 40b, 42b, 44b, 46b etc. associated with the UE B's network.

Originating Side Service Logic

Mobile satellite subscriber A utilizes the originating satellite mobile UE A 24a to make a voice call to mobile satellite subscriber B which is utilizing the terminating satellite mobile UE B 24b. Upon receiving the originating SIP INVITE message at step 5, the subscriber A's originating AS 26a executes the following logic: If the Require header and the Supported header in the SIP INVITE message do not contain preconditions and the SDP portion of the SIP INVITE message does not contain "desired QoS" and "current QoS" then the following steps occur:

1. A's AS 26a requests that A's PCRF 42a perform preliminary QoS authorization for an incoming voice call by sending an AAR Diameter request (SERVICE_INFO_STATUS: PRELIMINARY_SERVICE_INFORMATION, Media-Component-Description: Code-Data: "uplink" "offer" . . . ) to PCRF 42a (step 7). Alternatively, the AAR can include a new AVP such as NRSPCA_ON_OFFER to indicate to PCRF 42a that this is a call that requires NRSPCA on Offer. In which case, the PCRF 42a will delay sending AAA back to AS 26a until the PCRF 42a receives an indication of successful secondary PDP context activation from the GGSN 38a.

2. A's PCRF 42a requests that A's GGSN 38a perform NRSPCA for a voice call by sending a Diameter RAR message to GGSN 38a (step 9).

3. A's GGSN 38a requests that A's SGSN 40a create a secondary PDP context for a voice call (step 11).

4. A's SGSN 40a sends Request PDP Context Activation message to UE A 24a (step 12).

5. A's GGSN 38a, A's SGSN 40a, and UE A 24a together complete the NRSPCA procedure (steps 13-22).

6. A's AS 26a sends the SIP INVITE message back to S-CSCF 46a to continue the call (step 27).

7. A's S-CSCF 46a sends SIP INVITE message to B's I-CSCF 60 (if any) which interacts with HSS 50 and B's S-CSCF 46b to route the call to B's S-CSCF 46b (step 33).

Otherwise, if A's AS 26a determines that the Require header and the Supported header in the INVITE do contain preconditions and the SDP portion of the SIP INVITE message contain "desired QoS" and "current QoS" then A's AS 26a implements the existing originating AS service logic (see box between steps 6 and 7) where the AS 26a sends the SIP INVITE message to the originating S-CSCF to continue the call.

Terminating Side Service Logic

When B's AS 26b receives the terminating SIP INVITE message (step 35), then B's AS 26b executes the following service logic: If the Require header and the Supported header in the INVITE do not contain preconditions and the SDP portion of the INVITE does not contain "desired QoS" and "current QoS" then B's AS 26b retrieves B's HPA subscription 51 using anyone of several techniques. For example, B's AS 26b retrieves B's HPA subscription 51 from the HSS 50 upon receiving the SIP INVITE message (between steps 35 and 36). Or, B's AS 26b retrieves B's HPA subscription 51 from the HSS 50 when the UE B 24b first registers with IMS network 41 (see note between steps 35 and 36). Or, B's AS 26b retrieves B's HPA subscription 51 which is stored locally within the terminating AS 26b (see note between steps 35 and 36). After, B's AS 26b retrieves the B's HPA subscription 51 then the following steps are performed:

1. If B's AS 26b determines B's HPA subscription 51 is active, then B's AS 26b requests that B's PCRF 42b perform preliminary QoS authorization for an incoming voice call by sending an AAR including a new AVP named NRSPCA-_ON_OFFER AVP to B's PCRF 42b (step 37). If B does not subscribe to HPA, then B's AS 26b performs existing logic by sending the SIP INVITE message to the terminating S-CSCF 46b for processing (these steps are not shown because in the current discussion it is assumed that B subscribes to HPA).

2. B's PCRF 42b requests that B's GGSN 38b perform NRSPCA for an incoming voice call by sending a Diameter RAR message to B's GGSN 38b (step 39).

3. B's GGSN 38b requests that B's SGSN 40b create a secondary PDP context for a terminating voice call by sending a PDU Context Activation Request message to B's SGSN 40b (step 41).

4. If B is inside a building 61, UE B's 24b PMM state should be PMM IDLE. Therefore, B's SGSN 40b sends a Page message (Cause IE: "Terminating Conversational Call") to the satellite RAN 34b (step 42).

5. Since the Paging Cause IE is set to "Terminating Conversational Call", the satellite RAN 34*b* sends an HPA page to UE B 24*b* (step 43).

6. B receives a message on his/her UE B 24*b* saying something like this "There is an incoming voice call for you. If you are inside a building, please step outside the building to answer it" (between steps 43 and 44).

7. B steps outside the building 61 with UE B 24*b* to get ready to receive the SIP INVITE message (between steps 43 and 44).

8. B's GGSN 38*b*, B's SGSN 40*b*, B's satellite RAN 34*b*, and B's UE 24*b* together complete the NRSPCA procedure (steps 44-56).

9. B's PCRF 42*b* informs B's AS 26*b* that NRSPCA on Offer is completed by sending RAR message to B's AS 26*b* (step 59).

10. B's AS 26*b* returns the SIP INVITE to B's S-CSCF 46*b* which sends it to UE B 24*b* via B's P-CSCF 44*b* (steps 61-65).

11. UE B 24*b*, B's AS 26*b* etc. . . . exchange 100 Trying messaging, followed by 180 Ringing messaging, and 200OK (INVITE) with SDP messaging (step 66-101).

12. B's PCRF 42*b* performs final QoS authorization (steps 104-107).

13. Normal signaling continues beyond this point to establish call between UE A 26*a* and UE B 26*b* (steps 108-142).

From the foregoing, it should be appreciated in view of FIG. 6's signal flow diagram that the present invention has many advantages some of which are as follows:

The present invention by using the Network Requested Secondary PDP Context Activation (NRSPCA) on Offer instead of using the standard UE initiated Secondary PDP Context Activation procedure is able to eliminate preconditions and reduces by half the number of messaging exchange (no PRACK, UPDATE, and corresponding 200OKs) between the originating mobile satellite terminal UE A 24*a* and the terminating mobile satellite terminal UE B 24*b*. In addition, NRSPCA on Offer gives the operator full control in providing QoS for various end user services as the network instructs the UE A 24*a* and UE B 24*b* what QoS parameter values to use thus avoiding pre-provisioning of terminals.

The present invention by having the terminating AS 26*b* check for the HPA subscription 51 before initiating NRSPCA which triggers HPA allows the mobile satellite operator to charge subscribers for using HPA.

The present invention by having the satellite RAN 34*b* configured to send the HPA to the terminating satellite UE B 24*b* only when the terminating SIP INVITE request is for a "Terminating Conversational Call/Interactive Call" (e.g. a voice call or a push-to-talk request) optimizes page channel resource usage.

The present invention enables the terminating AS 26*b* to generate charging records for the HPA subscription and usage.

The present invention optimizes satellite radio resources usage and increases the successful call establishment rate by using Network Request Secondary PDP Context Activation on Offer and HPA to set up the mobile satellite to mobile satellite call or PSTN/PLMN device to mobile satellite call.

The present invention effectively reduces the number of SIP messages required to set up a mobile satellite to mobile satellite calls over IMS. The following TABLE #1 shows the processing time for a standard Mobile to PSTN call without NRSPCA on INVITE.

TABLE #1

| Message or Event | Delay (ms) |
| --- | --- |
| Uplink Assignment | 32 |
| \|-------- INVITE -------->\| | 533 |
| \|<-- 183 Session Progress ---\| | 433 |
| \|-------- PRACK -------->\| | 225 |
| \|<---- 200 OK (PRACK) -----\| | 266 |
| \|<...... Secondary PDP Context .......>\| | 1500 |
| \|-------- UPDATE -------->\| | 533 |
| \|<--- 200 OK (UPDATE) ----\| | 391 |
| \|<---- 180 Ringing -----\| | 208 |
| \|-------- PRACK -----     >\| | 225 |
| \|<---- 200 OK (PRACK) ------\| | 266 |
| \|<-------- 200 OK -------\| | 391 |
| Total Delay | 5000 |

RTT (ms) 31.5
Link Speed (kbps) 9.6
PDP Context (ms) 1500

The NRSPCA can reduce call setup time by a minimum of 2 seconds. For a mobile to mobile call, per the present invention the time saving will be even more due to the elimination of PRACK/200OK, UPDATE/200OK over the radio link to the terminating satellite UE B 24*b*.

The present invention gives the operator full control in providing QoS for various end user services thus avoiding QoS configuration in a variety of terminals from different vendors.

Figure 7:
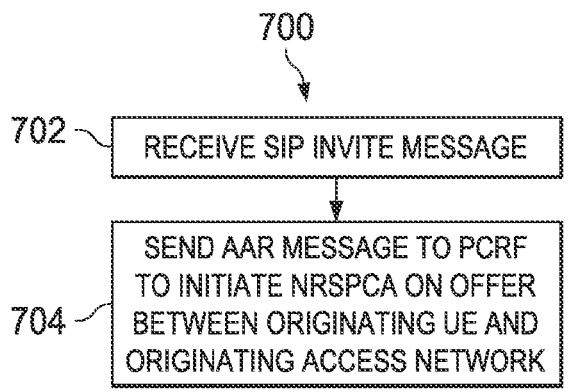
FIG. 7 is a flowchart illustrating a method which is implemented by an originating AS when establishing a call between an originating UE and a terminating satellite UE in accordance with an embodiment of the present invention.

Referring to FIG. 7, there is a flowchart illustrating a method 700 which is implemented by an originating AS 26*a* when establishing a call between an originating UE 24*a* and a terminating satellite UE 24*b* in accordance with an embodiment of the present invention. The originating AS 26*a* comprises at least a processor 701 and a memory 703 that stores processor-executable instructions where the processor 701 interfaces with the memory 703 and executes the processor-executable instructions to enable steps 702 and 704. At step 702, the originating AS 26*a* receives from the originating S-CSCF 46*a* a SIP INVITE message which is associated with the call for the terminating satellite UE 24*b* (FIG. 4's step 1 and FIG. 6's step 5). At step 704, the originating AS 26*a* sends to the originating PCRF 42*a* an AAR message to initiate a NRSPCA on Offer to establish a secondary PDP context between the originating access network 36*a* and the originating UE 24*a* via the originating RAN 34*a*. In one embodiment, the AAR message is sent to the originating PCRF 42*a* only if a Require header field and a Supported header field in the received SIP INVITE message do not contain preconditions and a SDP portion of the SIP INVITE message does not contain "desired QoS" and "current QoS." If desired, the AAR message may further include an AVP which indicates to the originating PCRF 42*a* that the call requires NRSPCA on Offer such that the PCRF 42*a* delays sending an AAA message back to the AS 26*a* until the PCRF 42*a* receives an indication of successful secondary PDP context activation from the originating GGSN 38*a*. The originating AS 26*a* can also perform other steps which have been described above with respect to FIG. 4 and FIG. 6.

Figure 8:
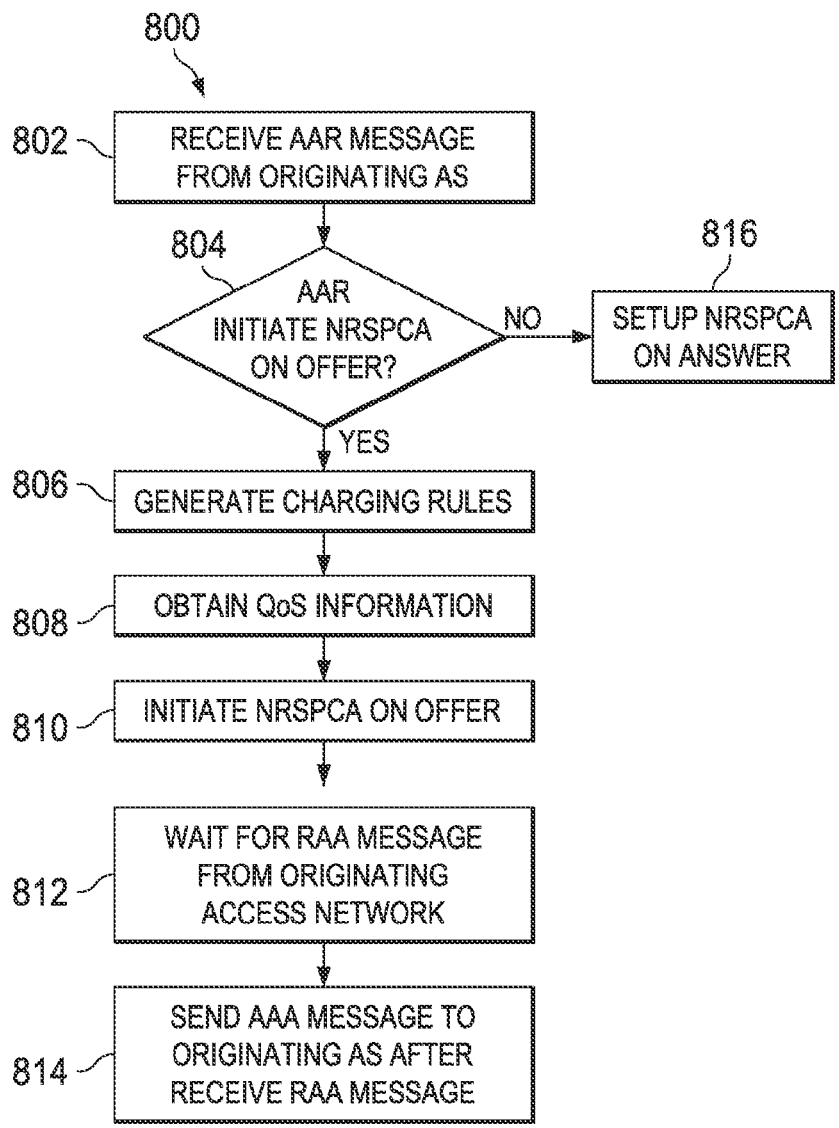
FIG. 8 is a flowchart illustrating a method which is implemented by an originating PCRF when establishing a call between an originating UE and a terminating satellite UE in accordance with an embodiment of the present invention.

Referring to FIG. 8, there is a flowchart illustrating a method 800 which is implemented by an originating PCRF 42*a* when establishing a call between an originating UE 24*a* and a terminating satellite UE 24*b* in accordance with an embodiment of the present invention. The originating PCRF 42*a* comprises at least a processor 801 and a memory 803 that stores processor-executable instructions where the processor 801 interfaces with the memory 803 and executes the processor-executable instructions to enable steps 802, 804, 806, 808, 810, 812, 814, and 816. At step 802, the originating PCRF 42a receives from the originating AS 26a an AAR to initiate a NRSPCA on Offer to establish a secondary PDP context between the originating access network 36a and the originating UE 24a via the originating radio access network 34a. At step 804, the originating PCRF 42a determines if the AAR indicates the NRSPCA on Offer. If the result of the determine step 804 is that the AAR does indicate the NRSPCA on Offer, then the originating PCRF 42a performs the following steps: (a) generate charging rules per media component (step 806); (b) obtain QoS information per media component (step 808); (c) initiate the NRSPCA on Offer by sending a RAR message to the originating access network 36a (e.g., GGSN 38a) (step 810); (d) wait to receive a RAA message from the originating access network 36a (e.g., GGSN 38a) which confirms establishment of the secondary PDP context between the access network 36a and the originating UE 24a via the radio access network 34a (step 812); (e) upon receipt of the RAA message from the originating access network 36a (e.g., GGSN 38a), send an AAA message back to the originating AS 26a (step 814). If the result of the determine step 804 is that the AAR does not indicate the NRSPCA on Offer, then the originating PCRF 42a at step 816 sets up a NRSPCA on Answer. The originating PCRF 42a can also perform other steps which have been described above with respect to FIG. 4 and FIG. 6.

Figure 9:
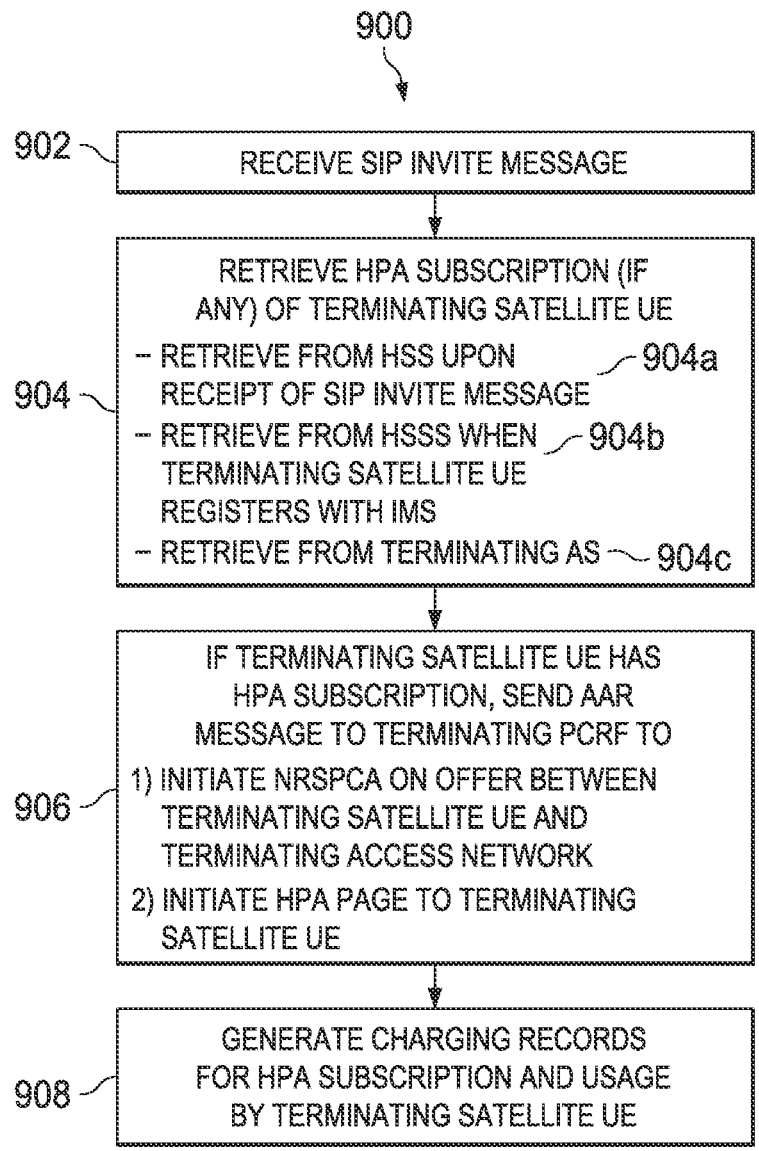
FIG. 9 is a flowchart illustrating a method which is implemented by a terminating AS when establishing a call between an originating UE and a terminating satellite UE in accordance with an embodiment of the present invention.

Referring to FIG. 9, there is a flowchart illustrating a method 900 which is implemented by a terminating AS 26b when establishing a call between an originating UE 24a and a terminating satellite UE 24b in accordance with an embodiment of the present invention. The terminating AS 26b comprises at least a processor 901 and a memory 903 that stores processor-executable instructions where the processor 901 interfaces with the memory 903 and executes the processor-executable instructions to enable steps 902, 904, 906, and 908. At step 902, the terminating AS 26b receives from the terminating access network 36b (e.g., S-CSCF 46b) a SIP INVITE message associated with the call for the terminating satellite UE 24b. At step 904, the terminating AS 26b retrieves a HPA subscription 51 if any associated with the terminating satellite UE 24b. For instance, the terminating AS 26b upon receiving the SIP INVITE message can retrieve the HPA subscription 51 from the HSS 50 over the Sh interface (step 904a). Or, the terminating AS 26b can retrieve the HPA subscription 51 from the HSS 50 over the Sh interface when the UE B 24b first registers with IMS network 41 (step 904b). Alternatively, the terminating AS 26b can retrieve the HPA subscription 51 which is stored locally in the terminating AS 26b (step 904c). At step 906, the terminating AS 26b upon determining that the terminating satellite UE 24b has the HPA subscription 51 operates to send the terminating PCRF 42b an AAR message to (1) initiate a NRSPCA on Offer to establish a secondary PDP context between the terminating access network 36b and the terminating satellite UE 24b via the terminating satellite radio access network 34b, and (2) initiate transmission of a HPA page to the terminating satellite UE 24b. In one embodiment, the terminating AS 26b sends the AAR message to the terminating PCRF 42b only if the terminating satellite UE 24b has the HPA subscription 51 and a Require header field and a Supported header field in the received SIP INVITE message do not contain preconditions and a Session Description Protocol (SDP) portion of the SIP INVITE message does not contain "desired QoS" and "current QoS." If desired, the AAR can include an AVP indicating to the terminating PCRF 42b that the call requires NRSPCA on Offer such that the PCRF 42b delays sending an AAA message back to the AS 26b until the PCRF 42b receives an indication of a successful secondary PDP context activation from the terminating access network 36b (e.g., GGSN 38b). The terminating AS 26b can also perform other steps which have been described above with respect to FIG. 5 and FIG. 6.

Figure 10:
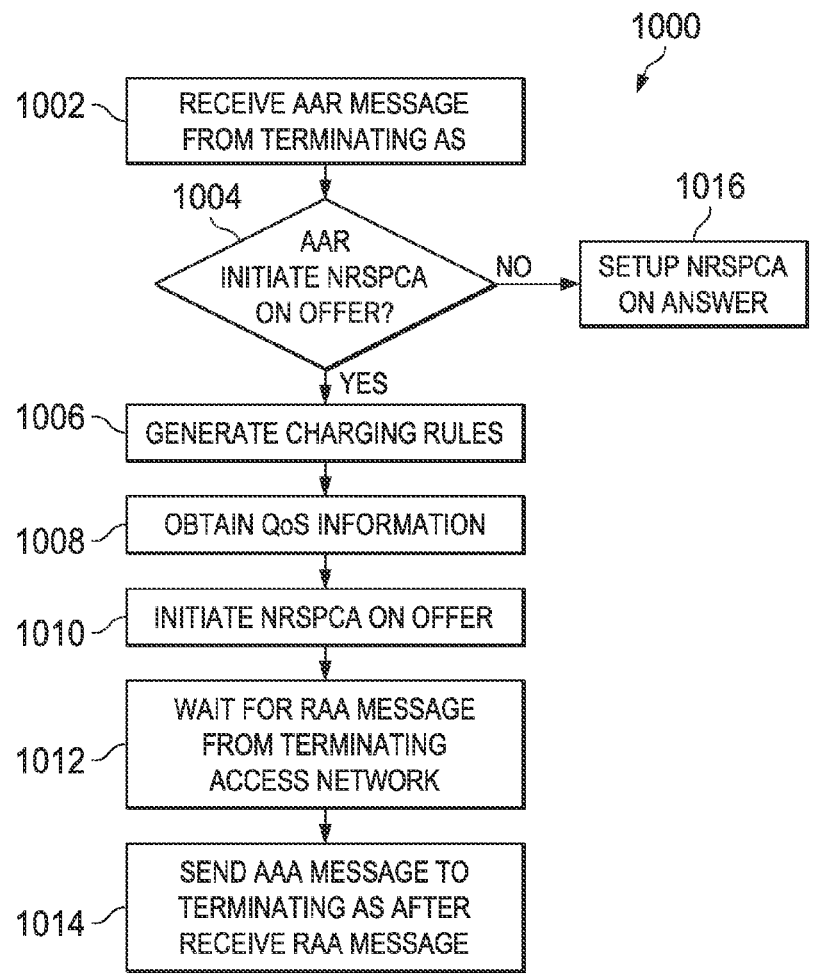
FIG. 10 is a flowchart illustrating a method which is implemented by a terminating PCRF when establishing a call between an originating UE and a terminating satellite UE in accordance with an embodiment of the present invention.

Referring to FIG. 10, there is a flowchart illustrating a method 1000 which is implemented by a terminating PCRF 42b when establishing a call between an originating UE 24a and a terminating satellite UE 24b in accordance with an embodiment of the present invention. The terminating PCRF 42a comprises at least a processor 1001 and a memory 1003 that stores processor-executable instructions where the processor 1001 interfaces with the memory 1003 and executes the processor-executable instructions to enable steps 1002, 1004, 1006, 1008, 1010, 1012, 1014, and 1016. At step 1002, the terminating PCRF 42a receives from the terminating AS 26a an AAR to initiate a NRSPCA on Offer to establish a secondary PDP context between the terminating access network 36b and the terminating satellite UE 24b via the terminating radio access network 34b. At step 1004, the terminating PCRF 42a determines if the AAR indicates the NRSPCA on Offer. If the result of the determine step 1004 is that the AAR does indicate the NRSPCA on Offer, then the terminating PCRF 42a performs the following steps: (a) generate charging rules per media component (step 1006); (b) obtain QoS information per media component (step 1008); (c) initiate the NRSPCA on Offer by sending a RAR message to the terminating access network 36b (e.g., GGSN 38b) (step 1010); (d) wait to receive a RAA message from the terminating access network 36b (e.g., GGSN 38b) which confirms establishment of the secondary PDP context between the terminating access network 36b and the terminating satellite UE 24b via the terminating radio access network 34b (step 1012); (e) upon receipt of the RAA message from the terminating access network 36b (e.g., GGSN 38b), send an AAA message back to the terminating AS 26b (step 1014). If the result of the determine step 1004 is that the AAR does not indicate the NRSPCA on Offer, then the terminating PCRF 42a sets up a NRSPCA on Answer. The terminating PCRF 42a can also perform other steps which have been described above with respect to FIG. 5 and FIG. 6.

Figure 11:
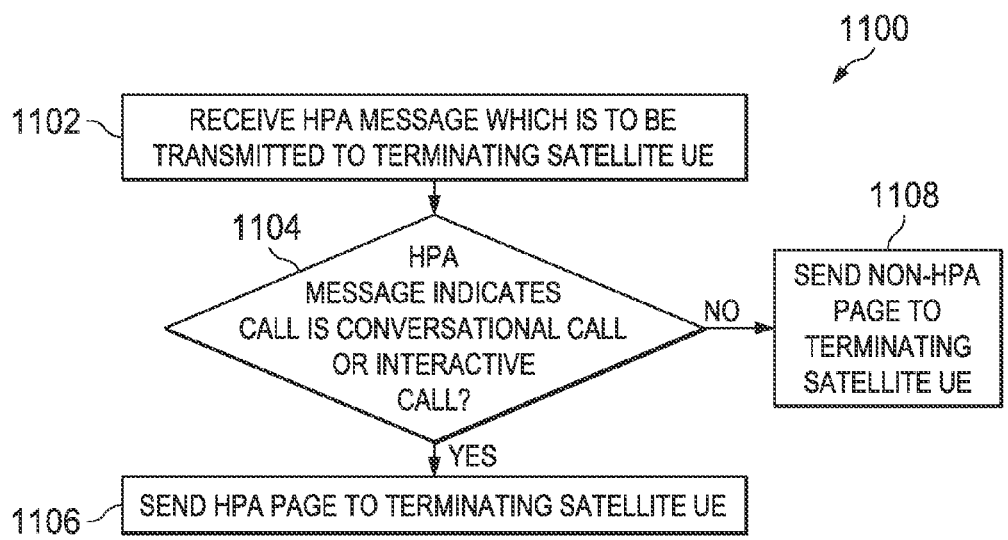
FIG. 11 is a flowchart illustrating a method which is implemented by a terminating satellite RAN when establishing a call between an originating UE and a terminating satellite UE in accordance with an embodiment of the present invention.

Referring to FIG. 11, there is a flowchart illustrating a method 1100 which is implemented by a terminating satellite RAN 34b when establishing a call between an originating UE 24a and a terminating satellite UE 24b in accordance with an embodiment of the present invention. The terminating satellite RAN 34b comprises at least a processor 1101 and a memory 1103 that stores processor-executable instructions where the processor 1101 interfaces with the memory 1103 and executes the processor-executable instructions to enable steps 1102, 1104, 1106, and 1108. At step 1102, the terminating satellite RAN 34b receives from the terminating SGSN 40b a HPA message which is to be transmitted to the terminating satellite UE 24b. At step 1104, the terminating satellite RAN 34b determines if the HPA message indicates that the call is a conversational call or interactive call. If the result of the determine step 1104 is that the HPA message indicates that the call is a conversational call or interactive call, then the terminating satellite RAN 34b at step 1106 sends a HPA page 61 to the terminating satellite UE 24b. If the result of the determine step 1104 is that the HPA message indicates that the call is not a conversational call or interactive call, then the terminating satellite RAN 34b at step 1108 sends a non-HPA page to the terminating satellite UE 24b. The terminating satellite RAN 34b can also perform other steps which have been described above with respect to FIG. 5 and FIG. 6.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An Application Server (AS) which takes part in establishing a call between an originating user equipment (UE) and a terminating satellite UE, wherein the AS is a component in an IP Multimedia Subsystem (IMS), wherein the IMS further comprises at least a Home Subscriber Server (HSS), a Proxy Call Session Control Function (P-CSCF), a Serving Call Session Control Function (S-CSCF), and a Policy Charging and Rule Function (PCRF), wherein the IMS is coupled to an access network, and wherein the access network is further coupled to a satellite radio access network, the AS comprising:
   a processor; and
   a memory that stores processor-executable instructions, wherein the processor interfaces with the memory to execute the processor-executable instructions, whereby the AS is operable to:
      receive from the access network, a Session Initiation Protocol (SIP) INVITE message associated with the call for the terminating satellite UE;
      retrieve a High Penetration Alert (HPA) subscription if any associated with the terminating satellite UE; and
      based on the terminating satellite UE having the HPA subscription, send, the PCRF, an Authorize and Authenticate Request (AAR) message to: (1) initiate a Network Initiated Secondary PDP Context Activation (NRSPCA) on Offer in order to establish a secondary Packet Data Protocol (PDP) context between the access network and the terminating satellite UE via the satellite radio access network, and (2) initiate transmission of a HPA page to the terminating satellite UE.

2. The AS of claim 1, wherein the AS is further operable to retrieve the HPA subscription from the HSS over a Sh interface.

3. The AS of claim 1, wherein the AS is further operable to retrieve the HPA subscription from the HSS over the Sh interface when the terminating satellite UE registers with the IMS.

4. The AS of claim 1, wherein the AS is further operable to retrieve the HPA subscription which is stored locally in the AS.

5. The AS of claim 1, wherein the AS is further operable to generate charging records for the HPA subscription and usage by the terminating satellite UE.

6. The AS of claim 1, wherein the AS is further operable to send the AAR message to the PCRF only when (1) the terminating satellite UE has the HPA subscription, (2) a Require header field and a Supported header field in the received SIP INVITE message do not contain preconditions, and (3) a Session Description Protocol (SDP) portion of the SIP INVITE message does not contain "desired QoS" and "current QoS".

7. The AS of claim 1, wherein the AAR further comprises an Attribute-Value Pair (AVP) indicating to the PCRF that the call requires NRSPCA on Offer such that the PCRF delays sending an Authentication, Authorization and Accounting (AAA) message back to the AS until the PCRF receives an indication of a successful secondary PDP context activation from the access network.

8. A method implemented in an Application Server (AS) which takes part in establishing a call between an originating user equipment (UE) and a terminating satellite UE wherein the AS is a component in an IP Multimedia Subsystem (IMS), wherein the IMS further comprises at least a Home Subscriber Server (HSS), a Proxy Call Session Control Function (P-CSCF), a Serving Call Session Control Function (S-CSCF), and a Policy Charging and Rule Function (PCRF), wherein the IMS is coupled to an access network, and wherein the access network is further coupled to a satellite radio access network, the method implemented in the AS comprising steps of:
   receiving, by the AS from the access network, a Session Initiation Protocol (SIP) INVITE message associated with the call for the terminating satellite UE;
   retrieving, by the AS, a High Penetration Alert (HPA) subscription if any associated with the terminating satellite UE; and
   based on the terminating satellite UE having the HPA subscription, sending, by the AS to the PCRF, an Authorize and Authenticate Request (AAR) message to (1) initiate a Network Initiated Secondary PDP Context Activation (NRSPCA) on Offer in order to establish a secondary Packet Data Protocol (PDP) context between the access network and the terminating satellite UE via the satellite radio access network, and (2) initiate transmission of a HPA page to the terminating satellite UE.

9. The method of claim 8, wherein the retrieving step further comprises retrieving HPA subscription from the HSS over a Sh interface.

10. The method of claim 8, wherein the retrieving step further comprises retrieving HPA subscription from the HSS over a Sh interface when the terminating satellite UE registers with the IMS.

11. The method of claim 8, wherein the retrieving step further comprises retrieving HPA subscription which is stored locally in the AS.

12. The method of claim 8, further comprising a step of generating charging records for the HPA subscription and usage by the terminating satellite UE.

13. The method of claim 8, wherein the step of sending the AAR message further comprises sending the AAR message to the PCRF only when (1) the terminating satellite UE has the HPA subscription, (2) a Require header field and a Supported header field in the received SIP INVITE message do not contain preconditions, and (3) a Session Description Protocol (SDP) portion of the SIP INVITE message does not contain "desired QoS" and "current QoS".

14. The method of claim 8, wherein the AAR further comprises an Attribute-Value Pair (AVP) indicating to the PCRF that the call requires NRSPCA on Offer such that the PCRF delays sending an Authentication, Authorization and Accounting (AAA) message back to the AS until the PCRF receives an indication of a successful secondary PDP context activation from the access network.

15. A Policy Charging and Rule Function (PCRF) which takes part in establishing a call between an originating user equipment and a terminating satellite UE, wherein the PCRF is a component in an IP Multimedia Subsystem (IMS), wherein the IMS further comprises at least an Application Server (AS), a Home Subscriber Server (HSS), a Proxy Call Session Control Function (P-CSCF), and a Serving Call Session Control Function (S-CSCF), wherein the IMS is coupled to an access network, and wherein the access network is further coupled to a satellite radio access network, the PCRF comprising:
   a processor; and a memory that stores processor-executable instructions, wherein the processor interfaces with the memory to execute the processor-executable instructions, whereby the PCRF is operable to:

receive, from the AS, an Authorize and Authenticate Request (AAR) to initiate a Network Initiated Secondary PDP Context Activation (NRSPCA) on Offer in order to establish a secondary Packet Data Protocol (PDP) context between the access network and the terminating satellite UE via the satellite radio access network;

determine whether the AAR indicates the NRSPCA on Offer;

based on a result of the determine operation that the AAR does indicate the NRSPCA on Offer:
  generate charging rules per media component;
  obtain Quality of Service (QoS) information per media component;
  initiate the NRSPCA on Offer by sending a Re-Auth-Request (RAR) message to the access network;
  wait to receive a Re-Auth-Answer (RAA) message from the access network which confirms establishment of a secondary Packet Data Protocol (PDP) context between the access network and the terminating satellite UE via the satellite radio access network;
  upon receipt of the RAA message from the access network, send an Authentication, Authorization and Accounting (AAA) message back to the AS; and based on a result of the determine operation that the AAR does not indicate the NRSPCA on Offer, setup a NRSPCA on Answer.

16. A method implemented in a Policy Charging and Rule Function (PCRF) which takes part in establishing a call between an originating user equipment (UE) and a terminating satellite UE wherein the PCRF is a component in an IP Multimedia Subsystem (IMS), wherein the IMS further comprises at least an Application Server (AS), a Home Subscriber Server (HSS), a Proxy Call Session Control Function (P-CSCF), and a Serving Call Session Control Function (S-CSCF), wherein the IMS is coupled to an access network, and wherein the access network is further coupled to a satellite radio access network, the method implemented by the PCRF comprising steps of:

receiving, by the PCRF from the AS, an Authorize and Authenticate Request (AAR) to initiate a Network Initiated Secondary PDP Context Activation (NRSPCA) on Offer in order to establish a secondary Packet Data Protocol (PDP) context between the access network and the terminating satellite UE via the satellite radio access network;

determining, by the PCRF, whether the AAR indicates the NRSPCA on Offer;

based on a result of the determining step that the AAR does indicate the NRSPCA on Offer:
  generating by the PCRF, charging rules per media component;
  obtaining, by the PCRF, Quality of Service (QoS) information per media component;
  initiating, by the PCRF, the NRSPCA on Offer by sending a Re-Auth-Request (RAR) message to the access network;
  waiting, by the PCRF, to receive a re-Auth-Answer (RAA) message from the access network which confirms establishment of a secondary Packet Data Protocol (PDP) context between the access network and the terminating satellite UE via the satellite radio access network;
  upon receipt of the RAA message from the access network, sending, by the PCRF, an Authentication, Authorization and Accounting (AAA) message back to the AS; and based on a result of the determining step that the AAR does not indicate the NRSPCA on Offer, setting-up, by the PCRF, a NRSPCA on Answer.

* * * * *